US006658336B2

(12) United States Patent
Browne et al.

(10) Patent No.: US 6,658,336 B2
(45) Date of Patent: Dec. 2, 2003

(54) METHOD AND SYSTEM OF COOPERATIVE COLLISION MITIGATION

(75) Inventors: Alan Lampe Browne, Grosse Pointe, MI (US); Francis D. Wood, Detroit, MI (US); Osman D. Altan, Bloomfield Hills, MI (US)

(73) Assignee: General Motors Corporation, Detroit, MI (US)

( * ) Notice: Subject to any disclaimer, the term of this patent is extended or adjusted under 35 U.S.C. 154(b) by 48 days.

(21) Appl. No.: 09/853,186

(22) Filed: May 11, 2001

(65) Prior Publication Data

US 2002/0169533 A1 Nov. 14, 2002

(51) Int. Cl.[7] .......................... B60R 22/00; G06F 7/00; G06F 19/00
(52) U.S. Cl. .......................... 701/45; 701/301; 342/69; 342/72; 280/731; 280/732; 280/733
(58) Field of Search .......................... 701/45, 207, 208, 701/301, 117; 342/70, 57, 60, 33, 140, 36, 129, 135; 340/479, 70, 72, 69; 280/735, 728.1, 730.1, 730.2, 731–734, 801.2

(56) References Cited

U.S. PATENT DOCUMENTS

| 3,097,354 A | | 7/1963 | Blowney et al. ............. 343/6.5 |
|---|---|---|---|
| 4,398,172 A | | 8/1983 | Carroll et al. ............. 340/38 P |
| 4,552,456 A | * | 11/1985 | Endo ........................ 342/70 |
| 5,008,661 A | | 4/1991 | Raj ........................ 340/825.54 |
| 5,227,784 A | * | 7/1993 | Masamori et al. .......... 180/167 |
| 5,235,326 A | | 8/1993 | Beigel et al. .......... 340/825.54 |
| 5,529,138 A | * | 6/1996 | Shaw et al. .................. 180/169 |
| 5,646,612 A | | 7/1997 | Byon ........................ 340/903 |
| 5,771,008 A | | 6/1998 | Hayashi et al. ............. 340/905 |
| 6,012,008 A | | 1/2000 | Scully ......................... 701/45 |
| 6,028,548 A | * | 2/2000 | Farmer ....................... 342/129 |
| 6,085,151 A | * | 7/2000 | Farmer et al. ................ 342/70 |
| 2002/0135467 A1 | * | 9/2002 | Koike ........................ 340/436 |

FOREIGN PATENT DOCUMENTS

WO     WO 97/44216     11/1997

\* cited by examiner

*Primary Examiner*—Thomas G. Black
*Assistant Examiner*—Ronnie Mancho
(74) *Attorney, Agent, or Firm*—Kathryn A. Marra

(57) ABSTRACT

Identifying an object includes the steps of using a sensor onboard a subject vehicle to identify an imminent impact between the subject vehicle and an object, directing and transmitting an elicitation signal to the object from the subject vehicle, receiving onboard the subject vehicle a response signal from the object providing information that positively identifies the object, using the positive identification information to predict a severity level of the imminent collision, and selectively deploying at least one responsive device onboard the subject vehicle according to the predicted severity level. Also, a system for implementing the method is provided. The system includes a sensor, attachable to a subject vehicle, for identifying an imminent collision between the subject vehicle and an object; a first computer for processing dynamics data for the subject vehicle; a second computer for predicting a severity level of the imminent collision; an antenna; a transmitter for transmitting an elicitation signal via the antenna to the object; a reflector or transponder for sending a response signal from the object to the subject vehicle wherein the response signal provides information positively identifying the object; and a receiver for receiving the response signal via the antenna from the object.

42 Claims, 11 Drawing Sheets

METHOD AND SYSTEM OF COOPERATIVE COLLISION MITIGATION

TECHNICAL FIELD

The present invention relates to features in a vehicle for identifying objects and, more particularly, to a system for positively identifying the nature of an object, assessing the relationship between the object and the vehicle, and deploying responsive devices according to certain situations.

BACKGROUND OF THE INVENTION

Examples of typical vehicle responsive devices include inflatable air bag systems, seat belt systems with pyrotechnic pretensioners, bumper systems, knee bolster systems and the like. These systems can be resettable, meaning that deployment does not effect their continued operability, and non-resettable, meaning once deployed, replacement is necessary. Vehicle responsive devices that require activation or deployment are generally triggered by, and thus during, an actual physical impact event itself. That is, many vehicles utilize deploy systems that include impact sensors which are sensitive to abrupt changes in vehicle inertia or momentum, such as, for example, coil spring sensors, magnet-and-ball sensors, or MEMS (micro-electro-mechanical systems) devices including capacitive and/or piezoresistive accelerometer sensors, to activate or deploy vehicle responsive devices.

Research and development work is under way for "predictive collision sensing systems" that include multiple line-of-sight sensors which sense the close-range position and relative velocity of an object just before an imminent collision. Such sensors would be utilizable, for example, to activate a braking system and/or pre-arm an airbag system just prior to collision impact. In making the actual decision to activate and/or pre-arm such vehicle responsive devices, the position and velocity of the object relative to the vehicle, as determined by the system sensors, are utilized to predict the potential severity of the imminent collision. A drawback in such a system is that a prediction of the severity of an imminent collision based merely upon the relative position and velocity of the object, without identifying the nature of the object itself, often proves to be inaccurate.

SUMMARY OF THE INVENTION

The present invention provides a method of deploying responsive devices in a vehicle, such as an automobile, in anticipation of an impact with an object. Such an object may include, for example, a tree, a mailbox, a sign, a fire hydrant, a post, a pole, a fence, a guardrail, a building structure, or another vehicle. According to the present invention, the method basically includes the steps of using a sensor onboard a subject vehicle to identify an imminent collision between the subject vehicle and an object, directing and transmitting an elicitation signal to the object from the subject vehicle, receiving onboard the subject vehicle a response signal from the object providing information positively identifying the object, using the positive identification information to predict a severity level of the imminent collision, and in response, selectively deploying at least one responsive device onboard the subject vehicle according to the predicted severity level.

To implement such a method, the present invention also provides a system for deploying responsive devices in a vehicle in anticipation of a collision with an object. According to the present invention, the system basically includes, first of all, a sensor attachable to a subject vehicle. The sensor serves to identify an imminent collision between the subject vehicle and an object. In addition, the system also basically includes a first computer and a second computer electrically connected to both the sensor and the first computer. The first computer is dedicated to processing dynamics data for the subject vehicle, and the second computer is dedicated to predicting a severity level of the imminent collision. Further, the system also basically includes an antenna, attachable to the subject vehicle, and a transmitter, electrically connected between the second computer and the antenna. The transmitter serves to transmit an elicitation signal via the antenna to the object. Still further, the system also basically includes means for sending a response signal, from the object and to the subject vehicle, and a receiver for receiving the response signal via the antenna. The response signal sending means is situatable on the object, and the receiver is electrically connected between the antenna and the second computer. The response signal received from the object provides information positively identifying the object. In such a configuration, the second computer is electrically connectable to at least one responsive device onboard the subject vehicle and is capable of using the positive identification information to predict the severity level of the imminent collision and selectively deploy each responsive device according to the predicted severity level.

In a preferred embodiment of the present invention, the sensor is either an electromagnetic radar type sensor, a laser radar type sensor, or a pulsed infrared laser type sensor. In addition, the transmitter is preferably a wideband radio-frequency (RF) type transmitter capable of transmitting an elicitation signal which is an electromagnetic, modulated radio-frequency type signal having a wide frequency bandwidth. Further, the response signal sending means is preferably either an active or passive transponder or at least one reflector capable of sending a predetermined response signal to the subject vehicle, thereby providing information positively identifying the object. Still further, the receiver preferably includes at least one filter for obtaining the positive identification information from the response signal in the form of a predetermined digital code. The predetermined digital code is preferably used by the second computer to look up and access object-specific data from a memory associated with the second computer. In this way, the second computer uses the object-specific data to predict the severity level of the imminent collision.

Also, in a preferred embodiment of the present invention, the system may include at least one responsive device electrically connected to the second computer. In such a configuration, the second computer is capable of selectively communicating a deploy signal to each responsive device according to the predicted severity level. In this way, the deploy signal serves as an activation signal for each responsive device which is resettable, and the deploy signal serves as an enabling signal for each responsive device which is non-resettable. In such a preferred embodiment, a resettable responsive device may include, for example, a pretensionable seat belt, an extendable/retractable bumper, or an extendable/retractable knee bolster device. A non-resettable responsive device may include, for example, an inflatable airbag.

Further, in a preferred embodiment of the present invention, the system may include a global positioning system (GPS) device which is attachable to the subject vehicle and electrically connected to the first computer and/or the second computer. Such a global positioning system device is useful for obtaining subject vehicle position data and digital map data therefrom for use in providing information positively identifying the object.

Still further, in a preferred embodiment of the present invention, the system may include a communications device attachable to the subject vehicle and electrically connected to the first computer and/or the second computer. The communications device preferably includes, first of all, a communications antenna, attachable to the subject vehicle, and a transmitter, electrically connected between the communications antenna and the first computer and/or the second computer. The communications transmitter is preferably capable of transmitting an electromagnetic polling signal via the communications antenna to the object when the imminent collision is identified to thereby determine whether the object is another vehicle having another communications device onboard. In addition, the communications device also preferably includes a receiver, electrically connected between the communications antenna and the first computer and/or the second computer. The communications receiver is preferably capable of receiving onboard the subject vehicle an electromagnetic affirmative signal via the communications antenna transmitted from the communications device onboard the object vehicle. In this way, after receiving the affirmative signal, the subject vehicle is capable of exchanging vehicle data with the object vehicle via the communications device to thereby predict the severity level of the imminent collision.

Advantages, design considerations, and applications of the present invention will become apparent to those skilled in the art when the detailed description of the best mode contemplated for practicing the invention, as set forth hereinbelow, is read in conjunction with the following drawings.

BRIEF DESCRIPTION OF THE DRAWINGS

The present invention will be described hereinbelow, by way of example, with reference to the following drawings.

DESCRIPTION OF THE PREFERRED EMBODIMENT

The present invention provides a method and system for deploying responsive devices in a vehicle, such as an automobile, in anticipation of a collision with an object. Such an object may include, for example, a tree, a mailbox, a sign, a fire hydrant, a post, a pole, a fence, a guardrail, a building structure, or even another vehicle. In deploying vehicle responsive devices, the present invention anticipates an imminent collision with an object so that vehicle features are activated, deployed, or pre-armed. In addition, the present invention also identifies the nature of the object so that collision severity can be predicted and so that individual vehicle responsive devices can be selectively deployed based on predicted collision severity. A detailed description of the preferred embodiments of the present invention is as follows.

1. First Embodiment

Figure 1:
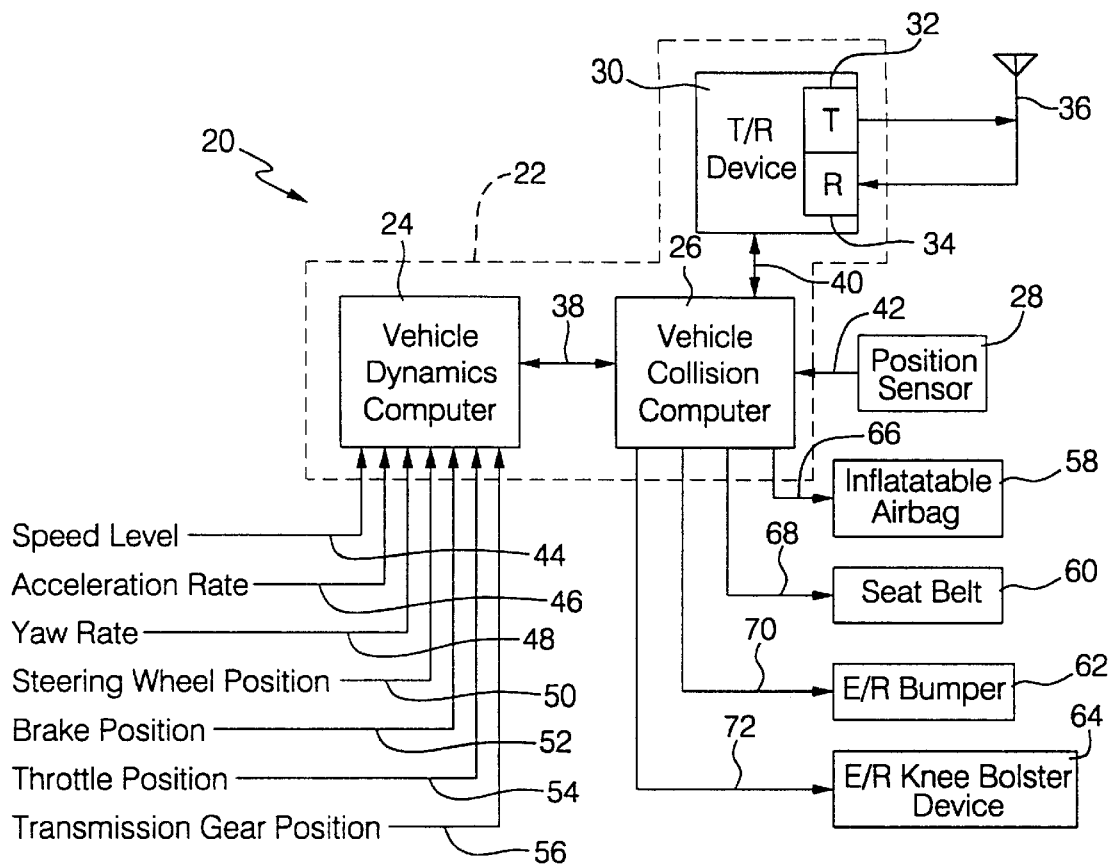
FIG. 1 is a block diagram of a basic hardware system, according to the present invention, for deploying responsive devices in a vehicle in anticipation of a collision with an object.

FIG. 1 is a block diagram of a basic hardware system 20 for deploying responsive devices in a vehicle in anticipation of a collision with an object. The hardware system 20 includes a position sensor 28 and a computer assembly 22. The position sensor 28 is utilized to determine the real time position of an object relative to the vehicle. Although other conventional types of sensors may be used, the sensor 28 is preferably either an electromagnetic radar type sensor, a laser radar type sensor, or merely a pulsed infrared laser type sensor. The sensor 28 is preferably situated at or near the lateral perimeter of the vehicle to thereby facilitate optimal line-of-sight position sensing when an object comes close to the vehicle perimeter. Although only one position sensor 28 is illustrated in FIG. 1, it is to be understood that multiple position sensors may be situated at various different points along the perimeter of the vehicle to thereby facilitate the sensing of an object approaching from any direction.

Further in FIG. 1, the computer assembly 22 includes a first computer 24, a transmitter/receiver (T/R) device 30, and a second computer 26. The first computer 24 is dedicated to processing dynamics data for the vehicle. Such dynamics data may include, for example, real time data concerning the speed level, the acceleration rate, the yaw rate, the steering wheel position, the brake position, the throttle position, and/or the transmission gear position of the vehicle. As illustrated in FIG. 1, such real time data is communicated from various vehicle sensors and/or systems (not shown) to the first computer 24 via electrical conductor connections 44, 46, 48, 50, 52, 54, and 56.

The T/R device 30 of the computer assembly 22 includes both a transmitter 32 and a receiver 34 which are electrically connected to a directional-type antenna 36. The transmitter 32 is preferably a wideband radio-frequency type transmitter capable of transmitting, via the antenna 36, electromagnetic radio-frequency (RF) signals over a wide band of signal frequencies. The directional antenna 36 is used for both directing and transmitting an electromagnetic radio-frequency signal to the object and also for receiving a signal from the object. During transmission, the directional antenna 36 produces a substantially unidirectional radiation pattern which is directed toward the object. It is to be understood, however, that two separate antennas, one dedicated for directional transmission and one dedicated for receiving, may alternatively be used instead of the single directional antenna 36.

The second computer 26 of the computer assembly 22 is dedicated to predicting the severity level of any imminent collision between the vehicle and an object so that vehicle responsive devices can be selectively deployed according to the predicted severity level. To facilitate such predicting, the second computer 26 is electrically connected to the first computer 24 via electrical conductor connection 38, electrically connected to both the transmitter 32 and the receiver 34 of the T/R device 30 via electrical conductor connection 40, and electrically connected to the position sensor 28 via an electrical conductor connection 42. As illustrated in FIG. 1, deployable responsive devices onboard the vehicle may include an inflatable airbag 58, a pre-tensionable seat belt 60, an expandable/retractable bumper 62, and/or an expandable/retractable knee bolster device 64. Such vehicle responsive devices are electrically connected to the second computer 26 via electrical conductor connections 66, 68, 70, and 72 so that each responsive device can be selectively and timely deployed as deemed necessary by the second computer 26.

Figure 2:
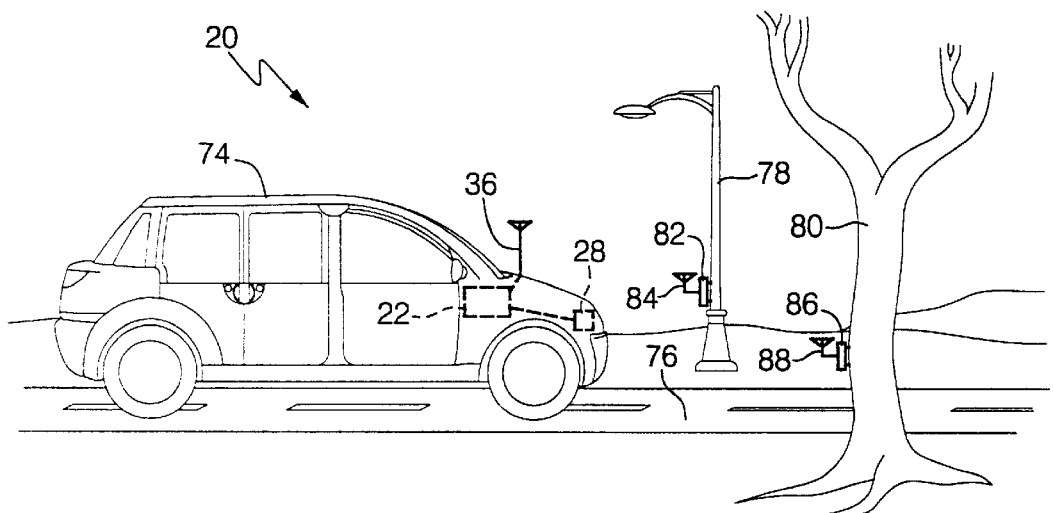
FIG. 2 is an illustration of a subject vehicle having the system of FIG. 1 onboard, wherein the subject vehicle faces potential collisions with a first object, for example, a street lamp post having a transponder, and a second object, for example, a tree having a reflector.

FIG. 2 is an illustration of a subject vehicle 74 having the system 20 of FIG. 1 onboard as the subject vehicle 74 travels along a drive path 76. The system 20 is attachable to and/or integrable with the structure of the subject vehicle 74. As illustrated, the subject vehicle 74 faces potential collisions with a first object and a second object, in this particular case, a street lamppost 78 and a tree 80.

With regard to the lamp post 78 as a first potential object of collision, the system 20 in this particular case includes an active transponder 82 with an antenna 84 situated and mounted on the lamppost 78. The transponder 82 is basically a small microprocessor device having a receiver circuit and a transmitter circuit electrically connected to the antenna 84. Except for the antenna 84, the microprocessor device of the transponder 82 is enclosed within a small protective box or container mounted on the object, in this case, the lamppost 78. Although the microprocessor device may operate with electrical power derived from the same power source used to illuminate the lamp light in the lamp post 78, the microprocessor device is preferably powered by rechargeable batteries which are periodically charged with an external energy collector such as, for example, a solar collector.

During operation, if the subject vehicle 74 veers away from the drive path 76 and moves toward the lamp post 78 such that the lamp post 78 comes within a predetermined sensing range (for example, 20 meters) of the sensor 28 onboard the subject vehicle 74, then the sensor 28 will sense the real time position of the lamp post 78 relative to the subject vehicle 74 and communicate real time object position data to the second computer 26 of the computer assembly 22 via connection 42. At generally the same time, relevant real time vehicle dynamics data from the first computer 24 is communicated to the second computer 26 as well via connection 38. Using both the real time object position data and the real time vehicle dynamics data, the second computer 26 then predicts a time until collision impact between the subject vehicle 74 and the lamp post 78. If the predicted time until collision impact becomes equal to or less than a predetermined imminency threshold time, the second computer 26 will then deem and identify the predicted collision as an imminent collision.

Once an imminent collision is identified, the second computer 26 initiates an elicitation or interrogation signal via connection 40 within the T/R device 30 such that the elicitation signal is directed and transmitted via the transmitter 32 and the directional antenna 36 toward the lamp post 78. The elicitation signal, as transmitted from the antenna 36, is an electromagnetic, modulated radio-frequency type signal which has a wide frequency bandwidth. In general, the same elicitation signal is transmitted to each object with which the subject vehicle 74 faces an imminent collision. The elicitation signal generally serves to prompt an object, in this case, the lamp post 78, to provide information which will positively identify the nature of the object to the subject vehicle 74. The directional nature of the antenna 36 helps ensure that the elicitation signal is not inadvertently transmitted to another object (for example, the tree 80) instead of, or in addition to, the lamppost 78. In this way, only the object with which a collision is imminently anticipated is prompted for positive identification information.

After transmission via the directional antenna 36, the elicitation signal is then received by the antenna 84 and the receiver circuit of the transponder 82 which is mounted on the lamppost 78. Once the elicitation signal is received, a response signal is immediately initiated and transmitted from the transmitter circuit and the antenna 84 of the transponder 82 toward the subject vehicle 74. The response signal, as transmitted from the antenna 84, is an electromagnetic radio-frequency type signal having a narrow, predetermined bandwidth of signal frequencies. This predetermined response signal generally serves to provide the subject vehicle 74 with information which positively identifies the nature of the object. More particularly, the predetermined frequency bandwidth of the response signal transmitted from the lamp post 78 serves to positively identify the first object (the lamp post 78) as a particular object type. According to the present invention, in other situations involving other types of objects, different objects will transmit different response signals having different narrow, predetermined frequency bandwidths. In this way, each object is differentiated and positively identified by the subject vehicle 74 according to object type by the particular frequency bandwidth of the respective response signal produced by the object.

After being transmitted from the transponder 82 mounted on the lamppost 78, the response signal is received by the antenna 36 and the receiver 34 of the T/R device 30 onboard the subject vehicle 74. The receiver 34 includes at least one electronic filter circuit for processing the response signal to thereby obtain information positively identifying the object from the response signal in the form of a predetermined digital code. Once obtained, the predetermined digital code is communicated to the second computer 26 via connection 40. When the predetermined digital code is received by the second computer 26, object-specific object size data which is pre-stored in a memory associated with the second computer 26 is looked up and accessed by the second computer 26 by using the predetermined digital code. The object size data may include, for example, data relating to one or more of the width, height, depth, or mass of the object, in this particular case, the lamp post 78.

Once the object-specific object size data is obtained, the second computer 26 then uses and processes known subject vehicle size data, real time subject vehicle dynamics data communicated from the first computer 24, real time object position data communicated from the sensor 28, and the obtained object size data to predict the degree of severity or the severity level of the identified imminent collision between the subject vehicle 74 and the lamp post 78. The known subject vehicle size data used in determining the severity level may include, for example, data relating to one or more of the width, height, depth, or mass of the subject vehicle 74.

Once a prediction of the severity level of the imminent collision is made, the second computer 26 then selectively deploys at least one responsive device onboard the subject vehicle 74 according to the predicted severity level. That is, in other words, depending upon the predicted severity level, the second computer 26 then decides, for each individual responsive device, whether or not the responsive device will be deployed. In general, if the predicted severity level is high, then the second computer 26 is more likely to deploy most, if not all, of the responsive devices. On the other hand, if the predicted severity level is low, then the second computer 26 is more likely to deploy fewer responsive devices. For example, if the subject vehicle 74 anticipates an imminent collision with a building structure at 50 kilometers per hour, then the inflatable airbag 58, the pre-tensionable seat belt 60, the extendable/retractable bumper 62, and the extendable/retractable knee bolster device 64 are all likely to be deployed by the second computer 26. In contrast, if the subject vehicle 74 anticipates an imminent collision with a building structure at only 10 kilometers per hour, then only the pre-tensionable seat belt 60 and the extendable/retractable bumper 62 are likely to be deployed by the second computer 26.

In selectively deploying the responsive devices, the second computer 26 selectively communicates a deploy signal to the responsive devices 58, 60, 62, and 64 via connections 66, 68, 70, and 72. For the responsive devices which are resettable, such as the pre-tensionable seat belt 60, the extendable/retractable bumper 62, and the extendable/ retractable knee bolster device 64, the deploy signal serves as an activation signal for activating the responsive devices prior to collision impact. For any responsive device which is non-resettable, such as the inflatable airbag 58, the deploy signal serves as a pre-arm or enabling signal for readying the activation of the responsive device upon collision impact. In a particular case where the predicted severity level of the collision is extremely high, such as in a case where the closing speed of the subject vehicle 74 toward a significant object as determined by the position sensor 28 is very fast, the deploy signal may instead serve as an actual activation signal for activating (in contrast to merely pre-arming or enabling) any non-resettable responsive device just prior to collision impact. If, by chance, a predicted collision fails to actually occur or if the collision is of minimal severity, the second computer 26 then communicates deactivation signals to the resettable responsive devices after a predetermined delay time has passed from the anticipated time of collision impact.

Figure 3:
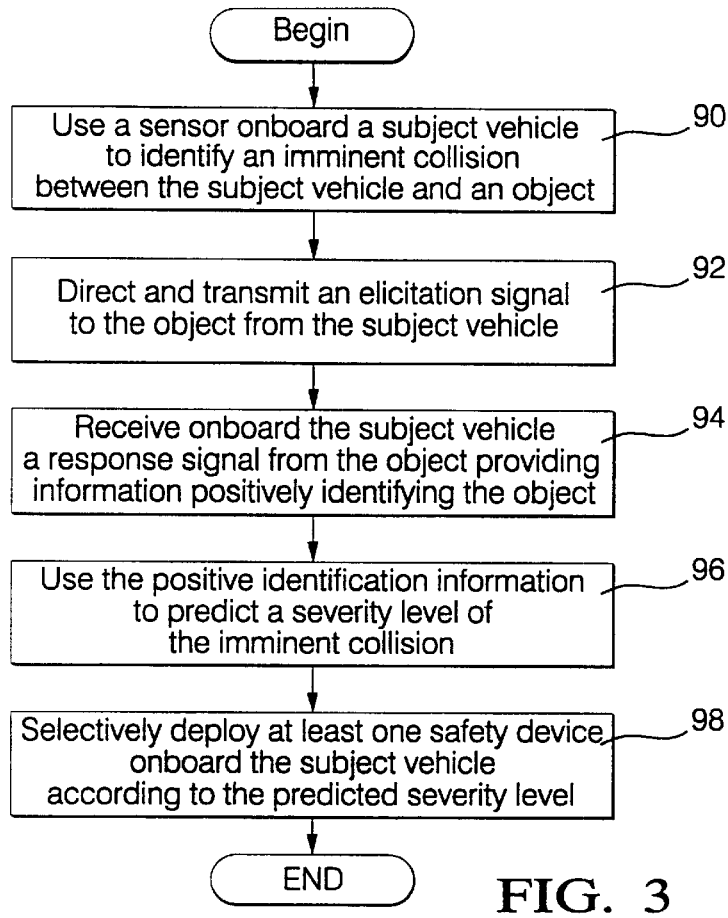
FIG. 3 is a flow diagram of a basic method, according to the present invention, for deploying responsive devices in a vehicle in anticipation of a collision with an object, wherein the method is implementable with the system of FIG. 1.

In light of the above, the method of deploying responsive devices in a vehicle in anticipation of a collision with an object, according to the present invention, can be generalized to include the basic method steps 90, 92, 94, 96, and 98 set forth in the flow diagram of FIG. 3. In particular, these basic steps include the step 90 of using a sensor onboard a subject vehicle to identify an imminent collision between the subject vehicle and an object, the step 92 of directing and transmitting an elicitation signal to the object from the subject vehicle, the step 94 of receiving onboard the subject vehicle a response signal from the object providing information positively identifying the object, the step 96 of using the positive identification information to predict a severity level of the imminent collision, and the step 98 of selectively deploying at least one responsive device onboard the subject vehicle according to the predicted severity level.

Further in FIG. 2, with regard to the tree 80 as a second potential object of collision, the system 20 in this particular case alternatively includes, instead of the active transponder 82 situated on the lamp post 78, a passive transponder or reflector 86 with an antenna 88 situated and mounted on the tree 80. The transponder or reflector 86 is passive in the sense that no integral power source is provided therewith. Although any conventional passive transponder or reflector may be incorporated in the present invention, in the case wherein a passive transponder is used instead of a reflector, the transponder is preferably of a type which includes an inductor-capacitor (LC) circuit electrically connected to the antenna 88.

Thus, during operation, if the subject vehicle 74 veers away from the drive path 76 and moves instead toward the tree 80 such that the tree 80 comes within the predetermined sensing range of the sensor 28, then an elicitation signal will instead be directed and transmitted toward the tree 80 when the anticipated collision between the subject vehicle 74 and the tree 80 is identified by the second computer 26 as being imminent. In the case wherein a reflector is situated on the tree 80, when the transmitted elicitation signal is received by the antenna 88, the reflector merely fashions a response signal having a narrow, predetermined frequency bandwidth which is object-specific from the elicitation signal having a wide frequency bandwidth. In essence, the fashioned response signal comprises a reflected, narrow bandwidth portion of the elicitation signal. Once the response signal is successfully generated or fashioned by the passive transponder or reflector 86, the response signal is sent via the antenna 88 to the subject vehicle 74 where the response signal is received by the antenna 36 and the receiver 34 of the T/R device 30. As explained previously herein, the receiver 34 uses at least one electronic filter circuit to process the response signal to thereby obtain information positively identifying the object from the response signal in the form of a predetermined digital code. Once obtained, the predetermined digital code is then communicated to the second computer 26 for predicting collision severity and ultimately deploying vehicle responsive devices in accordance therewith.

Despite the particular exemplary collision scenario described hereinabove with regard to FIG. 2, it is to be understood that any suitable type of conventional transponder, either active or passive, or conventional reflector may be situated on a particular object and thereby serve as a means for identifying the object to a subject vehicle pursuant to the present invention.

Figure 4:
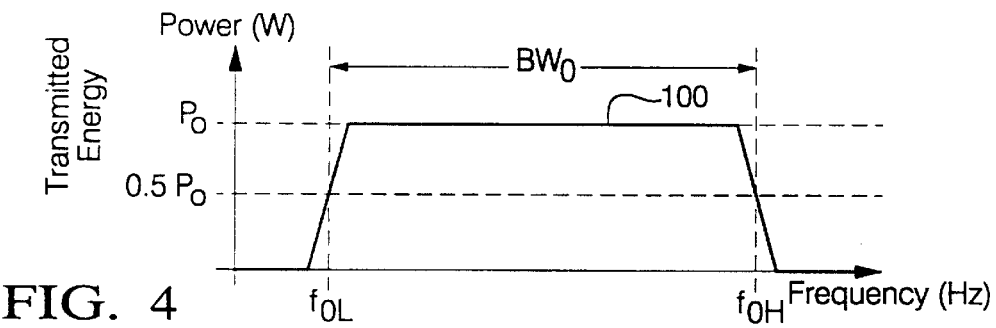
FIG. 4 is a graph illustrating the half-power frequency bandwidth of an elicitation signal transmitted from a wideband radio-frequency transmitter included in the system of FIG. 1.

In FIG. 4, an exemplary elicitation signal 100 having a signal power $P_0$ over a wide band of radio frequencies is graphically illustrated. The elicitation signal 100 has a half-power frequency bandwidth $BW_0$ measured from a low frequency cut-off $f_{0L}$ to a high frequency cut-off $f_{0H}$. In the case wherein a particular reflector is situated on a particular object with which a collision is imminent, the reflector reflects a single, narrow, predetermined bandwidth portion of the elicitation signal 100 as a response signal back toward the subject vehicle. More particularly, the reflector reflects only one narrow, predetermined bandwidth portion out of many different narrow frequency bands included within the bandwidth $BW_0$ of the elicitation signal 100 as a predetermined response signal for positively identifying the object on which the reflector is particularly situated. Thus, each particular reflector is only capable of reflecting one particular narrow frequency band of the elicitation signal. Examples of different response signals fashioned from the elicitation signal 100 by different reflectors on various different objects are graphically illustrated in FIG. 5. Such exemplary response signals include a response signal 101, a response signal 102, a response signal 103, and a response signal 104. Although the reflectors will absorb and/or dissipate some of the signal power $P_0$ of the elicitation signal 100 during reflection, each response signal fashioned and reflected from the elicitation signal 100 ideally has a signal power which approaches the same signal power $P_0$ of the elicitation signal 100. Thus, with further regard to the exemplary response signals illustrated in FIG. 5, the response signal 101 has a signal power which approaches $P_0$ and has a half-power frequency bandwidth $BW_1$ measured from a low frequency cut-off $f_{1L}$ to a high frequency cut-off $f_{1H1}$, and the response signal 102 has a signal power which approaches $P_0$ and has a half-power frequency bandwidth $BW_2$ measured from a low frequency cut-off $f_{2L}$ to a high frequency cut-off $f_{2H}$. Similarly, the response signal 103 has a signal power which approaches $P_0$ and has a half-power frequency bandwidth $BW_3$ measured from a low frequency cut-off $f_{3L}$ to a high frequency cut-off $f_{3H}$, and the response signal 104 has a signal power which approaches $P_0$ and has a half-power frequency bandwidth $BW_4$ measured from a low frequency cut-off $f_{4L}$ to a high frequency cut-off $f_{4H}$. Given such, the low frequency cut-off $f_{1L}$ of the response signal 101 should generally be equal to or greater than the low frequency cut-off $f_{0L}$ of the elicitation signal 100, and the high frequency cut-off $f_4H$ of the response signal 104 should generally be less than or equal to the high frequency cut-off $f_{0H}$ of the elicitation signal 100.

Figure 5:
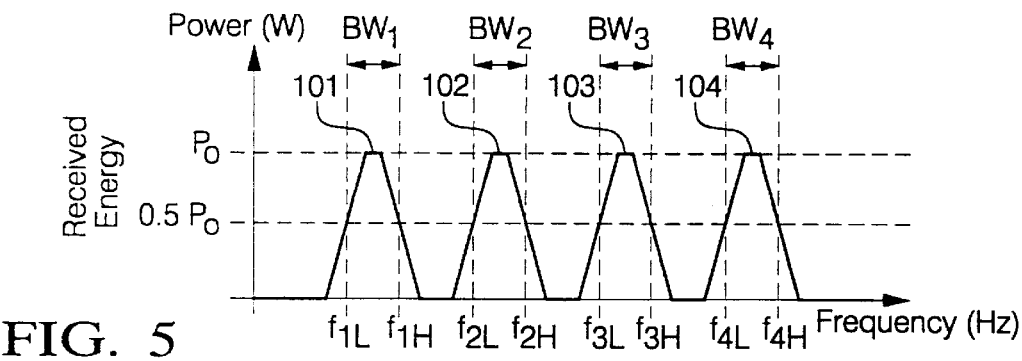
FIG. 5 is a graph illustrating half-power frequency bandwidths of one or more response signals over various frequency ranges, wherein each response signal is derived from one or more narrow predetermined frequency bands of the elicitation signal in FIG. 4 which are reflected from an object having one or more reflectors, such as the second object in FIG. 2.

Thus, in practice, each one of the particular response signals illustrated in FIG. 5 would serve to provide object-specific information for positively identifying the nature of a particular object with which a subject vehicle faces an imminent collision. For example, a reflector specifically designed to send the predetermined response signal 101 may be mounted on an object which is a highway guardrail so as to positively identify the object as a guardrail-type object with the particular response signal 101 to a subject vehicle. Similarly, another reflector specifically designed to send the predetermined response signal 102 may be mounted on an object which is a telephone pole so as to positively identify the object as a pole-type object with the particular response signal 102 to a subject vehicle. In this way, different response signals are used to positively identify different types or classes of objects to a subject vehicle. It is to be understood, however, that a single object may alternatively have multiple different reflectors mounted thereon at the same time which reflect different signals. In this way, a unique combination of different signals is used to form a composite response signal to identify each object. As a result, composite response signals can be encoded to thereby facilitate the positive identification of a larger number of different object types in response to an elicitation signal of a given fixed bandwidth. As an additional result, using a unique combination of different signals in the form of a composite response signal to identify an object helps prevent the misidentification of the object, which is more likely to occur when only a single band response signal is used to identify an object. Furthermore, when multiple different reflectors are used to identify a single object in this way, such reflectors may either be situated separately on the object or be integrated into a single composite reflector unit on the object.

2. Second Embodiment

Figure 6:
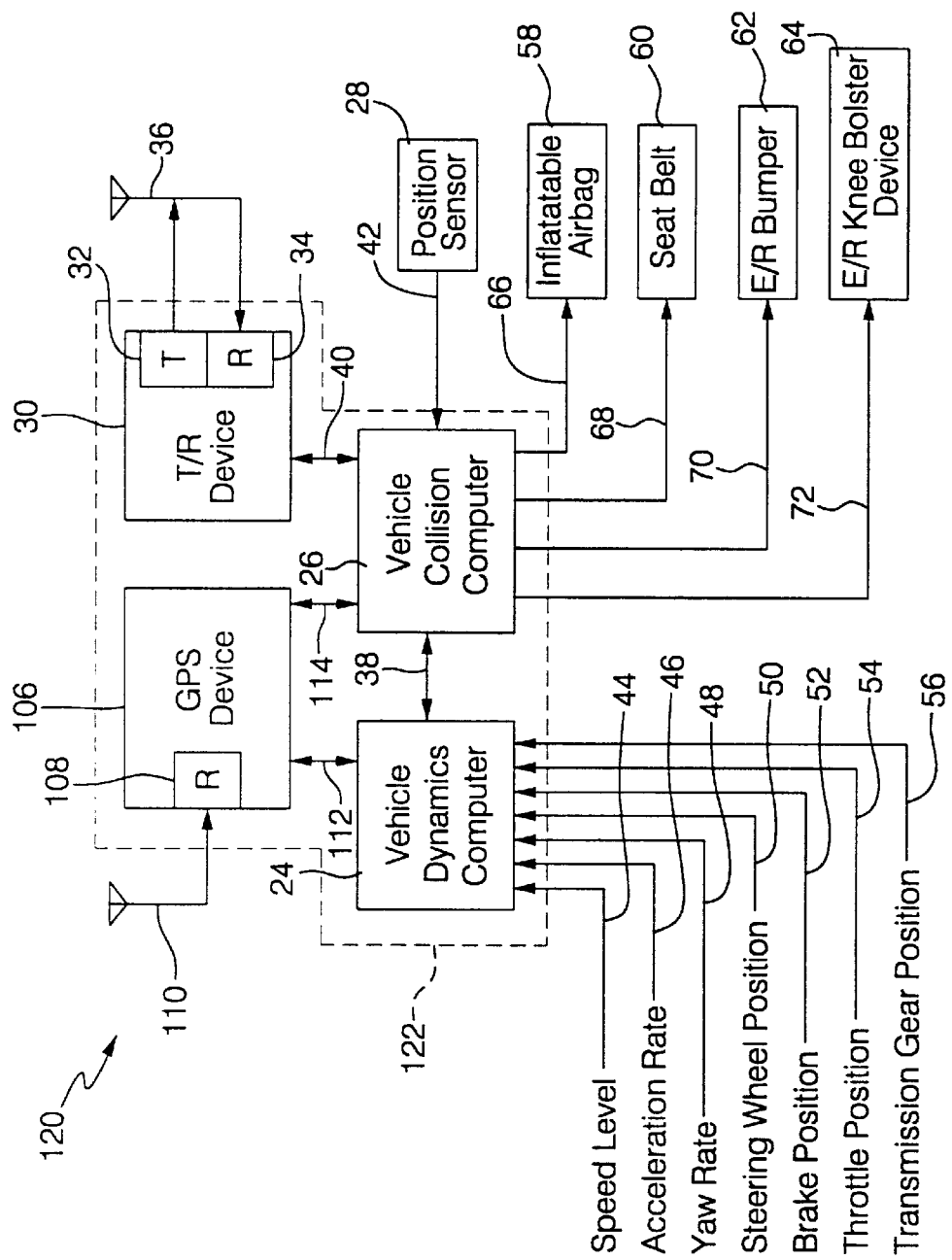
FIG. 6 is a block diagram of a hardware system for deploying responsive devices in a vehicle in anticipation of a collision with an object, wherein the system uniquely includes a global positioning system (GPS) device as compared to the system of FIG. 1.

FIG. 6 is a block diagram of an alternative hardware system 120 for deploying responsive devices in a vehicle in anticipation of a collision with an object. Similar to the basic hardware system 20 in the previous embodiment, the hardware system 120 in the present embodiment includes the position sensor 28 and a computer assembly 122. As compared to the previous embodiment, the computer assembly 122 in the present embodiment uniquely includes a global positioning system (GPS) device 106 in addition to the first computer 24, the transmitter/receiver (T/R) device 30, and the second computer 26. The GPS device 106 is used in conjunction with a large database of detailed road and highway map information in the form of digital map data. Incorporating the GPS device 106 within the computer assembly 122 of the hardware system 120 is desirable for at least the following two reasons. First, the GPS device 106 enables a vehicle to obtain real time vehicle position data (for example, longitude and latitude) from at least one (for example, three) GPS satellite to thereby help precisely determine where the vehicle is positioned on or near a particular roadway. Second, recent advances in GPS technology have now yielded GPS devices utilizable with digital map data containing very detailed information concerning both the identity and position of various objects situated along or near roadways. Some of these objects may include, for example, signs, poles, fire hydrants, barriers, bridges, bridge pillars, and overpasses. In addition, the digital map data utilized with and/or provided by such recent GPS devices is easily updateable via remote transmissions (for example, via a cell phone) from GPS customer service centers so that detailed information concerning both the identity and position of even temporary signs or blocking structures set up during brief periods of road-related construction is available as well. Thus, by incorporating the GPS device 106 in the computer assembly 122 of the hardware system 120 onboard a vehicle, the hardware system 120 then has additional means, as compared to the system 20 in the first embodiment, for positively identifying an object with which the vehicle anticipates an imminent collision.

Further in FIG. 6, the GPS device 106 includes a receiver 108 and an antenna 110 for obtaining real time subject vehicle position data from a global positioning system satellite. As illustrated, the GPS device 106 is electrically connected to the first computer 24 via electrical conductor connection 112 and is electrically connected to the second computer 26 via electrical conductor connection 114 to thereby provide the first computer 24 and the second computer 26 with access to the real time subject vehicle position data and the digital map data. It is to be understood, however, that one of the direct connections, either 112 or 114, from the GPS device 106 may alternatively be omitted since any subject vehicle position data and/or digital map data which is directly accessed via the one remaining direct connection can be optionally shared by the first computer 24 and the second computer 26 via the connection 38.

Figure 7:
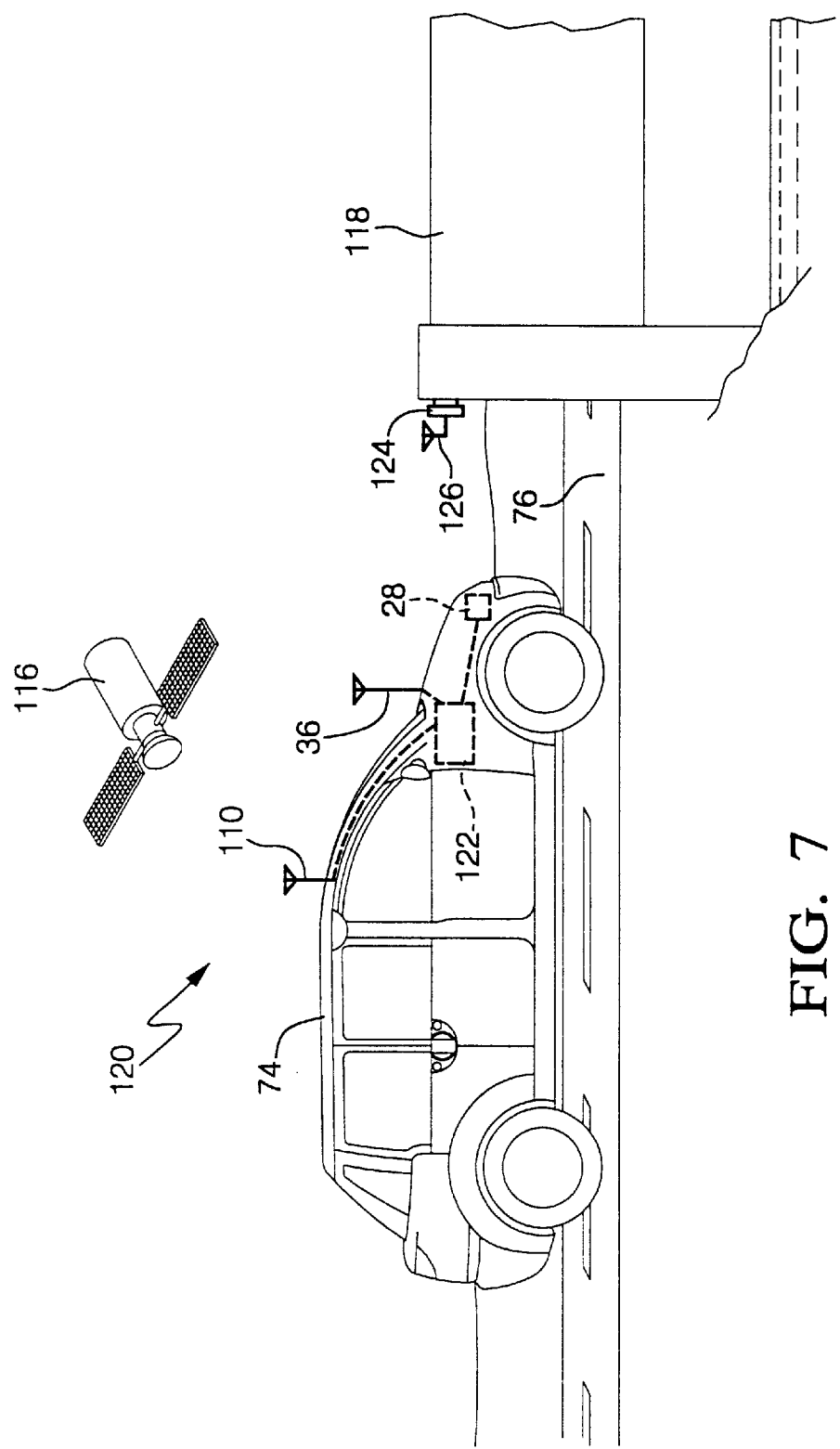
FIG. 7 is an illustration of a subject vehicle having the system of FIG. 6 onboard, wherein the subject vehicle faces a potential collision with an object, for example, a bridge abutment.

FIG. 7 is an illustration of the subject vehicle 74 alternatively having the system 120 of FIG. 6 onboard as the subject vehicle 74 travels along the drive path 76. The system 120 is attachable to and/or integrable with the structure of the subject vehicle 74. As illustrated in FIG. 7, the subject vehicle 74 faces a potential collision with an object which, in this case, is an abutment of a bridge 118. With regard to the bridge 118 as a potential object of collision, the system 120 includes a reflector 124 with an antenna 126 situated and mounted on the bridge 118. As an alternative, it is to be understood that the reflector 124 in the system 120 may optionally be replaced with either an active or passive transponder.

During operation, the GPS device 106 is first activated or turned on by an operator, such as the human driver of the subject vehicle 74, to establish electromagnetic radio-frequency communication linkage between the subject vehicle 74 and at least one (for example, three) global positioning system satellite 116. In this way, real time subject vehicle position data from the satellite 116 is obtained via the antenna 110 and the receiver 108 of the GPS system device 106 so that the subject vehicle position data, along with the digital map data, can be timely communicated when necessary to the first computer 24 and/or the second computer 26 via connection 112 and/or connection 114. Next, if the subject vehicle 74 veers away from the drive path 76 and moves toward the abutment of the bridge 118 such that the abutment comes within a predetermined sensing range (for example, 20 meters) of the sensor 28 onboard the subject vehicle 74, then the sensor 28 will sense the real time position of the abutment of the bridge 118 relative to the subject vehicle 74 and communicate real time object position data to the second computer 26 of the computer assembly 122 via connection 42. At about the same time, relevant real time vehicle dynamics data from the first computer 24 is communicated to the second computer 26 as well via connection 38. Using both the real time object position data and the real time vehicle dynamics data, the second computer 26 then predicts a time until collision impact. If the predicted time until collision impact becomes equal to or less than a predetermined imminency threshold time, the second computer 26 will then deem and identify the predicted collision as an imminent collision.

Once an imminent collision is identified, real time object position data provided by the sensor 28 via connection 42 and both real time subject vehicle position data and digital map data provided by the GPS device 106 are used by the second computer 26 to determine whether the digital map data provides information positively identifying the object. If the object is successfully positively identified based on the digital map data provided by the GPS device 106, then this information is used by the second computer 26 to predict the severity level of the imminent collision and selectively deploy each of the vehicle responsive devices accordingly.

If, on the other hand, the object is not successfully positively identified based on the digital map data provided by or utilized with the GPS device 106, then the second computer 26 initiates an elicitation signal via connection 40 so that the elicitation signal is directed and transmitted via the transmitter 32 and the antenna 36 of the T/R device 30 toward the abutment of the bridge 118. The elicitation signal is then received by the reflector 124 mounted on the abutment of the bridge 118 via the antenna 126. Once the elicitation signal is received, a response signal comprising a reflected, narrow, predetermined bandwidth portion of the elicitation signal is immediately sent from the reflector 124 via the antenna 126 toward the subject vehicle 74. As generally explained earlier herein with regard to the first embodiment, the predetermined frequency bandwidth of the response signal sent from the abutment of the bridge 118 enables the second computer 26 onboard the subject vehicle 74 to positively identify the nature of the object (the bridge 118) and predict the severity of the imminent collision. Once this is done, the second computer 26 then proceeds, as also generally explained earlier herein, to selectively deploy each of the vehicle responsive devices 58, 60, 62, and 64 according to the predicted severity.

Figure 8:
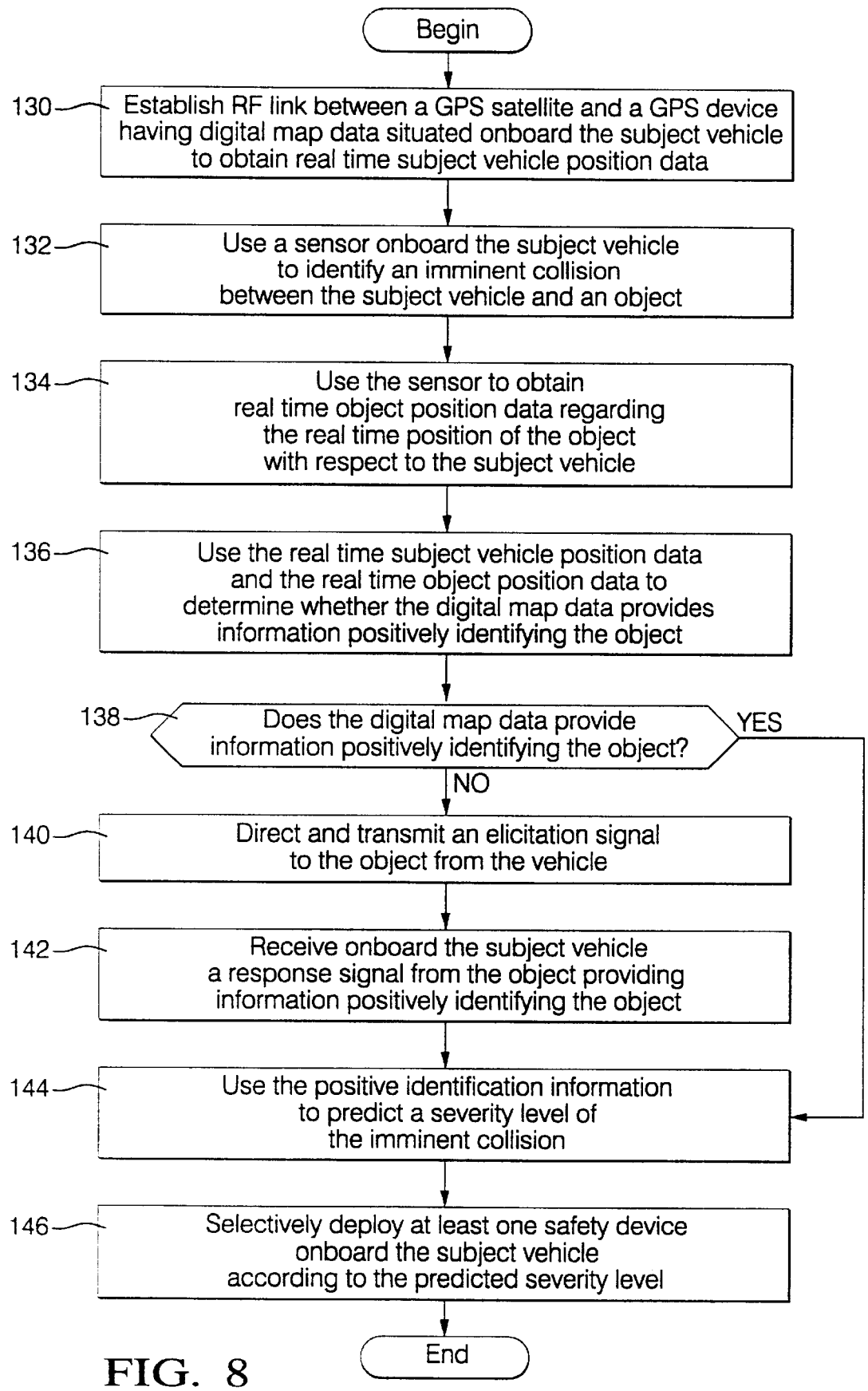
FIG. 8 is a flow diagram of a method for deploying responsive devices in a vehicle in anticipation of a collision with an object, wherein the method is implementable with the system of FIG. 6.

In light of the above with regard to the system 120, the method of deploying responsive devices in a vehicle in anticipation of a collision with an object, according to the present invention, can be generalized to include the method steps 130, 132, 134, 136, 138, 140, 142, 144, and 146 as set forth in the flow diagram of FIG. 8. In particular, these steps include the step 130 of establishing electromagnetic radio-frequency (RF) communication linkage between at least one global positioning system (GPS) satellite and a GPS device having digital map data situated onboard the subject vehicle to obtain real time subject vehicle position data from the satellite for use onboard the subject vehicle, the step 132 of using a sensor onboard a subject vehicle to identify an imminent collision between the subject vehicle and an object, the step 134 of using the sensor to obtain real time object position data regarding the real time position of the object with respect to the subject vehicle, and the step 136 of using the real time subject vehicle position data and the real time object position data to determine whether the digital map data provides information positively identifying the object. According to the question step 138, if the digital map data does not provide information positively identifying the object, then both the step 140 of directing and transmitting an elicitation signal to the object from the subject vehicle and the step 142 of receiving onboard the subject vehicle a response signal from the object providing information positively identifying the object are performed before the step 144 is performed. On the other hand, if the digital map data does provide information positively identifying the object, then the steps 140 and 142 are skipped, and the step 144 is then performed after the step 138. After obtaining positive identification information concerning the object, whether the information was obtained from digital map data or received via a response signal from the object itself, the step 144 of using the positive identification information to predict a severity level of the imminent collision is performed. After the step 144, the step 146 of selectively deploying at least one responsive device onboard the subject vehicle according to the predicted severity level is ultimately performed.

With further regard to the method in FIG. 8, it should be noted that the steps 132 and 134 are closely related and may alternatively be executed separately in the reverse order or even executed simultaneously such that the very same real time object position data obtained by the sensor 28 is used both for identifying an imminent collision and for trying to obtain object identification information from the digital map data. In addition, it should also be noted that the particular method in FIG. 8 dictates that an elicitation signal not be transmitted to an object when the object is successfully positively identified with digital map data provided by the GPS device 106. That is, an elicitation signal is only transmitted to an object when the object is not successfully identified with the digital map data provided by the GPS device 106.

Figure 9:
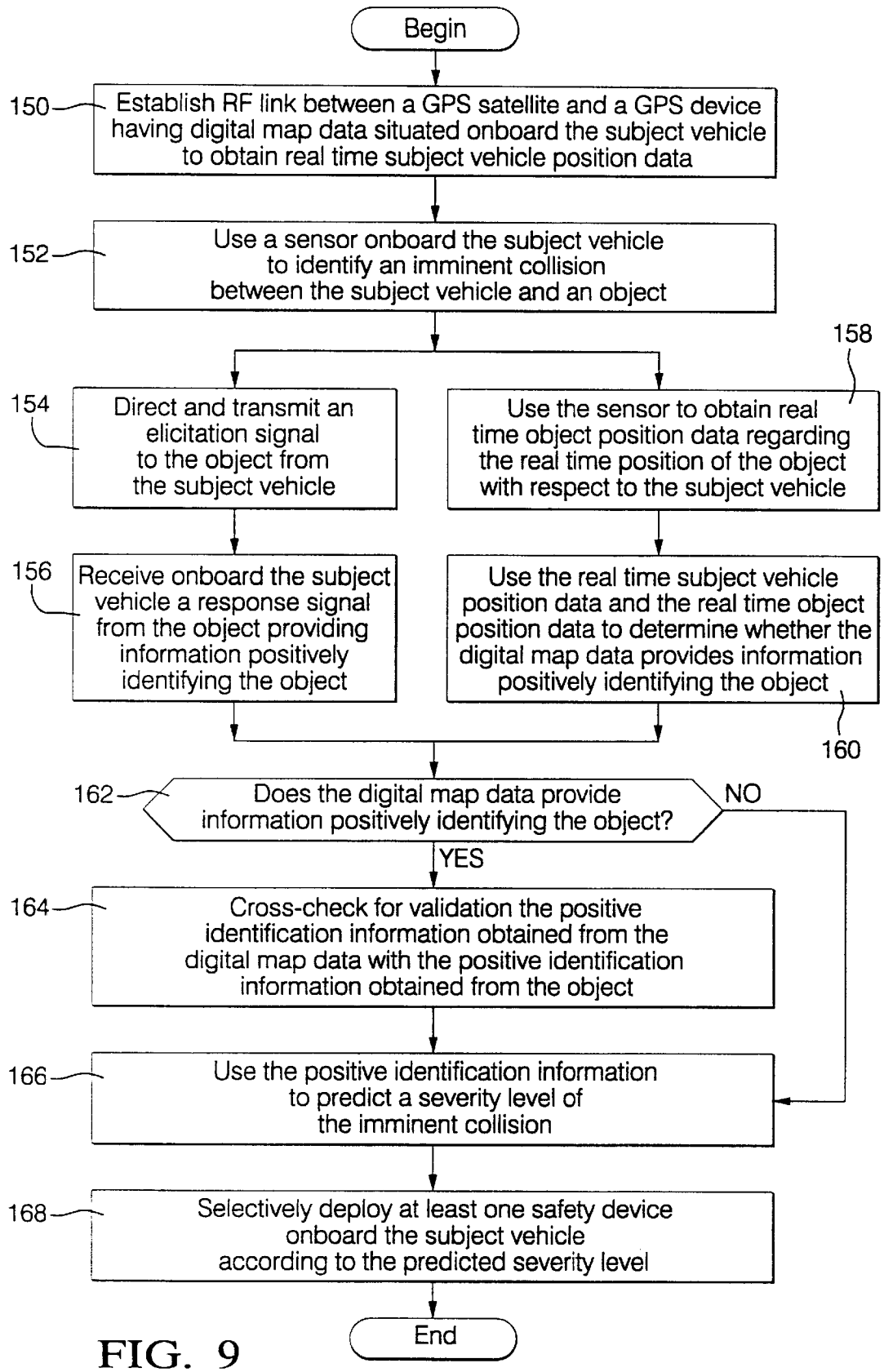
FIG. 9 is a flow diagram of a method for deploying responsive features in a vehicle in anticipation of a collision with an object, wherein the method is implementable with the system of FIG. 6 and is an alternative to the method of FIG. 8.

In contrast to the method in FIG. 8, the flow diagram in FIG. 9 sets forth a slightly different method of deploying responsive devices in a vehicle in anticipation of a collision with an object. In particular, according to the method of FIG. 9, an elicitation signal is always transmitted to an object when a collision therewith is imminent. This is so even if the object is successfully identified with the GPS device 106. In particular, whenever information positively identifying the object is successfully obtained from the GPS device 106, then that information is cross-checked with identification information that is obtained from the object itself via a response signal prompted by an elicitation signal. By cross-checking object identification information in this manner, object misidentification is improved.

The method set forth in the flow diagram of FIG. 9 generally includes the method steps 150, 152, 154, 156, 158, 160, 162, 164, 166, and 168. More particularly, the method includes the step 150 of establishing electromagnetic radio-frequency (RF) communication linkage between at least one global positioning system (GPS) satellite and a GPS device having digital map data situated onboard the subject vehicle to obtain real time subject vehicle position data from at least one satellite for use onboard the subject vehicle, the step 152 of using a sensor onboard the subject vehicle to identify an imminent collision between the subject vehicle and an object, the step 154 of directing and transmitting an elicitation signal to the object from the subject vehicle, the step 156 of receiving onboard the subject vehicle a response signal from the object providing information positively identifying the object, the step 158 of using the sensor to obtain real time object position data regarding the real time position of the object with respect to the subject vehicle, and the step 160 of using the real time subject vehicle position data and the real time object position data to determine whether the digital map data provides information positively identifying the object. According to the question step 162, if the digital map data does provide information positively identifying the object, then the step 164 of cross-checking for validation the positive identification information obtained from the digital map data with the positive identification information obtained from the object is performed before executing the step 166 and the step 168. If, on the other hand, the digital map data does not provide information positively identifying the object, then the step 164 is skipped, and the step 166 of using the positive identification information to predict a severity level of the imminent collision and the step 168 of selectively deploying at least one responsive device onboard the subject vehicle according to the predicted severity level are thereafter performed.

With further regard to the method in FIG. 9, it should be noted that the steps 154 and 156 may be executed in parallel with the steps 158 and 160. As an alternative, the steps 154, 156, 158, and 160 may instead all be serially executed in various different serial orders as long as the step 154 is performed sometime before the step 156 and as long as the step 158 is performed sometime before the step 160. Furthermore, it should also be noted that the steps 152 and 158 are closely related and may alternatively be executed separately in the reverse order or executed simultaneously such that the very same real time object position data obtained by the sensor 28 is used both for identifying an imminent collision and for trying to obtain object identification information from the digital map data. However, the step 152 is most preferably performed before the step 154.

3. Third Embodiment

Figure 10:
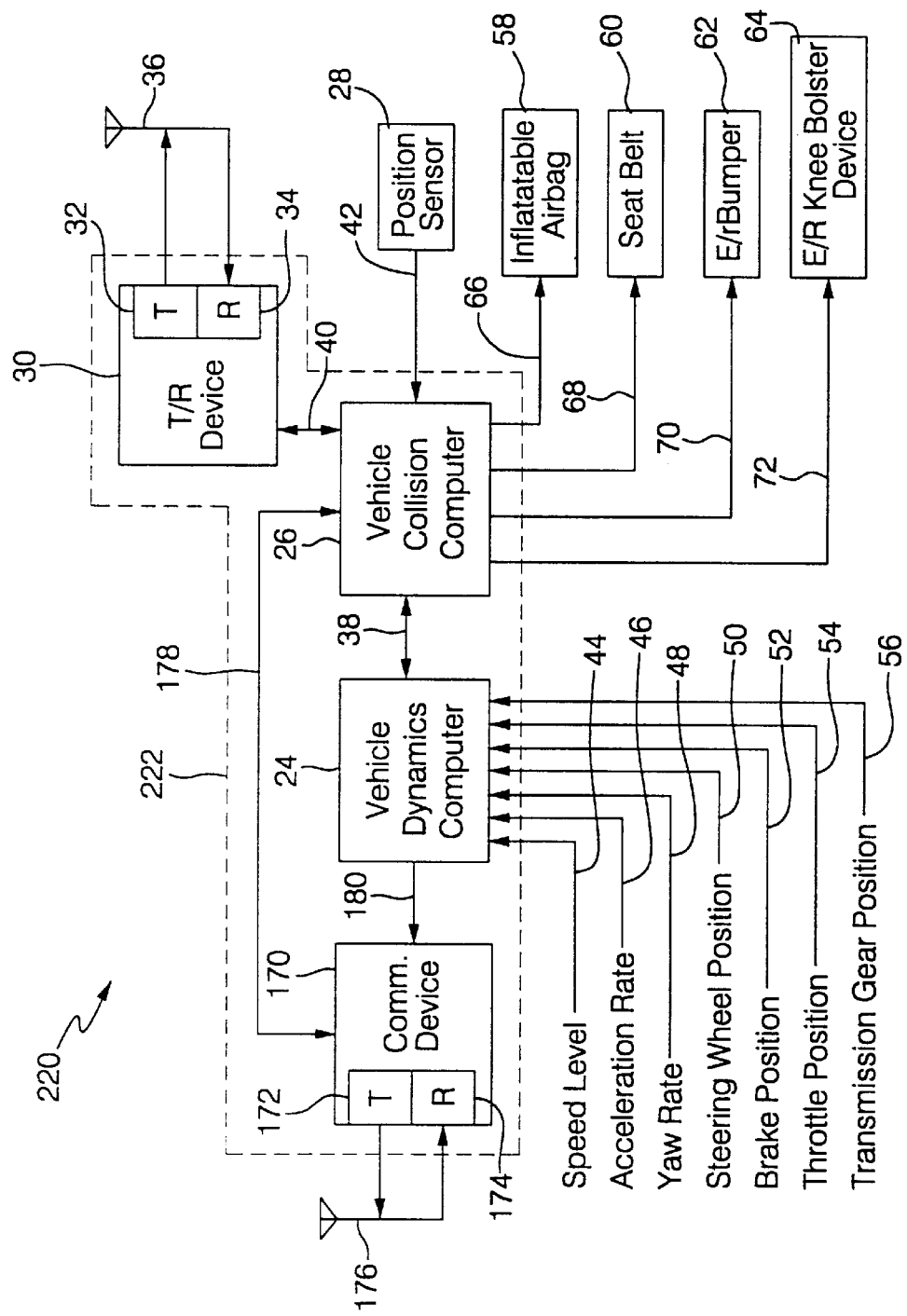
FIG. 10 is a block diagram of a hardware system for deploying responsive devices in a vehicle in anticipation of a collision with an object, wherein the system uniquely includes a vehicle-to-vehicle communications device as compared to the system of FIG. 1.

FIG. 10 is a block diagram of another alternative hardware system 220 for deploying responsive devices in a vehicle in anticipation of a collision with an object. Similar to the basic hardware system 20 in the first embodiment, the hardware system 220 in the present embodiment includes the position sensor 28 and a computer assembly 222. As compared to the first embodiment, the computer assembly 222 in the present embodiment uniquely includes a vehicle-to-vehicle communications device 170 in addition to the first computer 24, the transmitter/receiver (T/R) device 30, and the second computer 26. The communications device 170, along with the remainder of the computer assembly 222 of the hardware system 220, is situated onboard a subject vehicle. The communications device 170 is dedicated to communicating with an object with which an imminent collision is anticipated only when that object happens to be another vehicle (hereinafter, "object vehicle") having a similar hardware system with a reciprocal communications device onboard. In this way, both the subject vehicle and the object vehicle can transmit and receive vehicle size data and/or vehicle dynamics data to and from each other via their respective onboard communications devices in order to predict collision severity.

Further in FIG. 10, the communications device 170 includes a transmitter 172 and a receiver 174 electrically connected to a communications antenna 176. The communications antenna 176 is preferably a directional-type antenna. The communications device 170 is electrically connected to the second computer 26 via electrical conductor connection 178 and is also electrically connected to the first computer 24 via electrical conductor connection 180. Given such a configuration, the connection 180 permits the transfer of subject vehicle dynamics data from the first computer 24 to the object vehicle via the communications device 170. The connection 178, on the other hand, permits the transfer of subject vehicle size data from the second computer 26 to the object vehicle via the communications device 170. In addition, the connection 178 permits the transfer of electrical signals from the second computer 26 to the communications device 170 for activating and controlling the communications device 170. Lastly, the connection 178 permits object vehicle dynamics data and/or object vehicle size data to be communicated to the second computer 26 onboard the subject vehicle as received from the object vehicle via the communications device 170.

Figure 11:
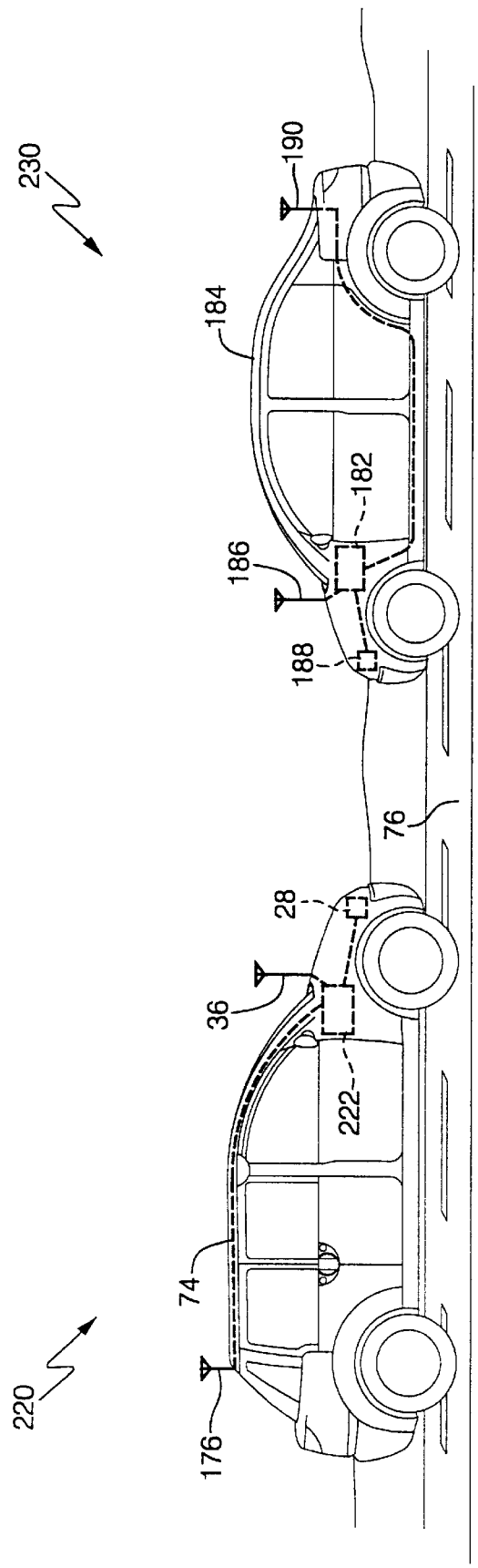
FIG. 11 is an illustration of a subject vehicle having the system of FIG. 10 onboard, wherein the subject vehicle faces a potential collision with an object vehicle having a system like that of the system of FIG. 10 onboard as well.

FIG. 11 is an illustration of the subject vehicle 74 alternatively having the system 220 of FIG. 10 onboard as the subject vehicle 74 travels along the drive path 76. The system 220 is attachable to and/or integrable with the structure of the subject vehicle 74. As illustrated in FIG. 11, the subject vehicle 74 faces a potential collision with an object which happens to be another vehicle, that is, an object vehicle 184. The object vehicle 184 has a reciprocal communications device incorporated in a hardware system 230 onboard, similar to that of the system 220 of FIG. 10. The system 230 onboard the object vehicle 184 is attachable to and/or integrable with the structure of the object vehicle 184. The system 230 includes a computer assembly 182 (including a reciprocal communications device), a T/R antenna 186, a position sensor 188, and a communications antenna 190, similar to those depicted in FIG. 10 with respect to the system 220.

During operation, if the subject vehicle 74 and the object vehicle 184 become headed toward each other for a potential collision such that the object vehicle 184 comes within a predetermined sensing range (for example, 20 meters) of the sensor 28 onboard the subject vehicle 74, then the sensor 28 will sense the real time position of the object vehicle 184 relative to the subject vehicle 74 and communicate real time object vehicle position data to the second computer 26 of the computer assembly 222 via connection 42. At generally the same time, relevant real time vehicle dynamics data from the first computer 24 is communicated to the second computer 26 as well via connection 38. Using both the real time object position data and the real time vehicle dynamics data, the second computer 26 then predicts a time until collision impact. If the predicted time until collision impact becomes equal to or less than a predetermined imminency threshold time, the second computer 26 will then deem and identify the predicted collision as an imminent collision.

Once an imminent collision is identified, the second computer 26 then initiates a polling signal via the connection 178 to be directed and transmitted via the transmitter 172 and the communications antenna 176 of the communications device 170 as an electromagnetic signal toward the object vehicle 184. The object vehicle 184 receives the polling signal via the communications antenna 190 onboard the object vehicle 184. Once the polling signal is received, the object vehicle 184 then directs and transmits via the communications antenna 190 an electromagnetic affirmative signal back toward the subject vehicle 74, thereby affirmatively informing the subject vehicle 74 that the object 184 is indeed another vehicle having a reciprocal communications device onboard. Once the affirmative signal is received, real time subject vehicle dynamics data provided by the first computer 24 and subject vehicle size data provided by the second computer 26 are transferred to the communications device 170 via the connection 180 and the connection 178. Then, both the real time subject vehicle dynamics data and the subject vehicle size data are directed and transmitted via the transmitter 172 and the communications antenna 176 to the object vehicle 184. Both the real time subject vehicle dynamics data and the subject vehicle size data are received by the object vehicle 184 via the communications antenna 190 onboard the object vehicle 184.

Once the transmission of vehicle data from the subject vehicle 74 to the object vehicle 184 is completed, then the object vehicle 184 transmits real time object vehicle dynamics data and object vehicle size data toward the subject vehicle 74 via the communications antenna 190 onboard the object vehicle 184. The real time object vehicle dynamics data and the object vehicle size data is received by the communications device 170 onboard the subject vehicle 74 via the communications antenna 176 and the receiver 174. Once received, the object vehicle data is transferred to the second computer 26 via the connection 178 to be processed therein. Along with real time object vehicle position data provided by the sensor 28 to the second computer 26, the real time object vehicle dynamics data, the object vehicle size data, known subject vehicle size data, and real time subject vehicle dynamics data are used by the second computer 26 to predict the severity level of the imminent collision between the subject vehicle 74 and the object vehicle 184. Similarly, the second computer of the computer assembly 182 onboard the object vehicle 184 uses real time subject vehicle position data provided by the sensor 188, the real time subject vehicle dynamics data, the subject vehicle size data, real time object vehicle dynamics data, and object vehicle size data to independently predict onboard the object vehicle 184 the severity level of the imminent collision.

If, upon identifying an imminent collision with an object, the subject vehicle 74 does not receive an affirmative signal in response to the polling signal, the subject vehicle 74 then assumes that the object is not another vehicle with a reciprocal communications device onboard. In such a case, the subject vehicle 74 then alternatively directs and transmits an elicitation signal to the object via the antenna 36 of the T/R device 30 as a backup means for attempting to positively identify and/or gain information from the object so that the level of collision severity can be predicted.

At this point, it is to be understood that if, during operation, the vehicle 74 and the vehicle 184 become headed toward each other and the vehicle 184 identifies an imminent collision before the vehicle 74 does, then the signaling roles of the vehicle 74 and the vehicle 184 as described earlier hereinabove are then reversed. That is, instead, the vehicle 184 sends a polling signal to the vehicle 74, and the vehicle 74 sends an affirmative signal back to the vehicle 184. Once the affirmative signal is received by the vehicle 184, then the vehicle 184 transmits vehicle data to the vehicle 74. Once transmission of the data is completed, then the vehicle 74 transmits vehicle data to the vehicle 184. In this way, both vehicles can independently predict the level of collision severity and deploy their respective vehicle responsive devices accordingly.

Figure 12:
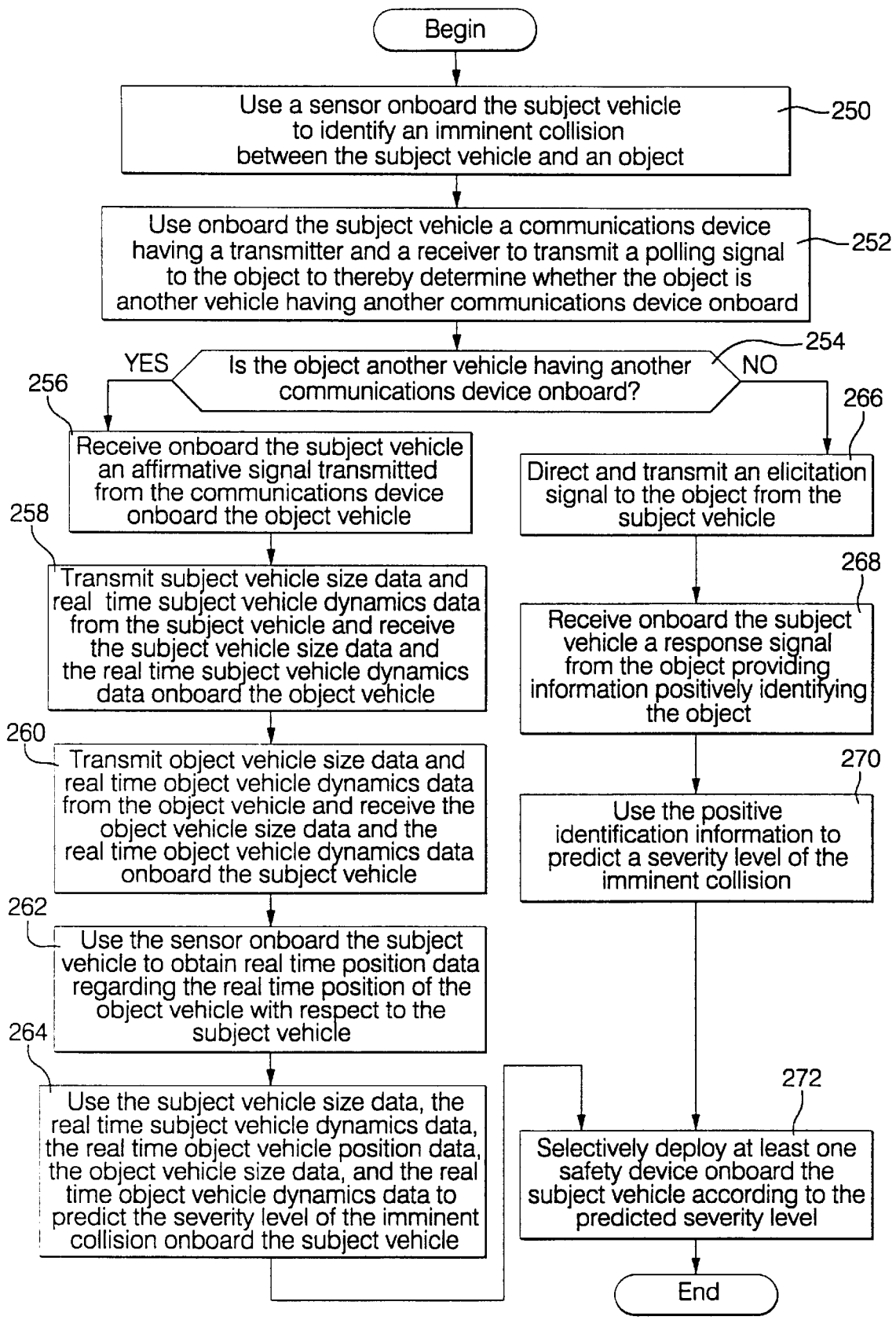
FIG. 12 is a flow diagram of a method for deploying responsive devices in a vehicle in anticipation of a collision with an object, wherein the method is implementable with the system of FIG. 10.

In light of the above with regard to the system 220 and the system 230, the method of deploying responsive devices in a vehicle in anticipation of a collision with an object, according to the present invention, can be generalized to include the method steps 250, 252, 254, 256, 258, 260, 262, 264, 266, 268, 270, and 272 as set forth in the flow diagram of FIG. 12. In particular, these steps include the step 250 of using a sensor onboard the subject vehicle to identify an imminent collision between the subject vehicle and an object and the step 252 of using onboard the subject vehicle a communications device having a transmitter and a receiver to transmit a polling signal to the object to thereby determine whether the object is another vehicle having another communications device onboard. According to the question step 254, if the object is another vehicle having a reciprocal communications device onboard, then the step 256 of receiving onboard the subject vehicle an affirmative signal transmitted from the communications device onboard the object vehicle, the step 258 of transmitting subject vehicle size data and real time subject vehicle dynamics data from the subject vehicle and receiving the subject vehicle size data and the real time subject vehicle dynamics data onboard the object vehicle, the step 260 of transmitting object vehicle size data and real time object vehicle dynamics data from the object vehicle and receiving the object vehicle size data and the real time object vehicle dynamics data onboard the subject vehicle, the step 262 of using the sensor onboard the subject vehicle to obtain real time object vehicle position data regarding the real time position of the object vehicle with respect to the subject vehicle, and the step 262 of using the subject vehicle size data, the real time subject vehicle dynamics data, the real time object vehicle position data, the object vehicle size data, and the real time object vehicle dynamics data to predict the severity level of the imminent collision onboard the subject vehicle are performed before the step 272. If, on the other hand, the object is not another vehicle having a reciprocal communications device onboard, then the step 266 of directing and transmitting an elicitation signal to the object from the subject vehicle, the step 268 of receiving onboard the subject vehicle a response signal from the object providing information positively identifying the object, and the step 270 of using the positive identification information to predict a severity level of the imminent collision are instead performed before the step 272. Thereafter, the step 272 of selectively deploying at least one responsive device onboard the subject vehicle according to the predicted severity level is ultimately performed.

4. Fourth Embodiment

Figure 13:
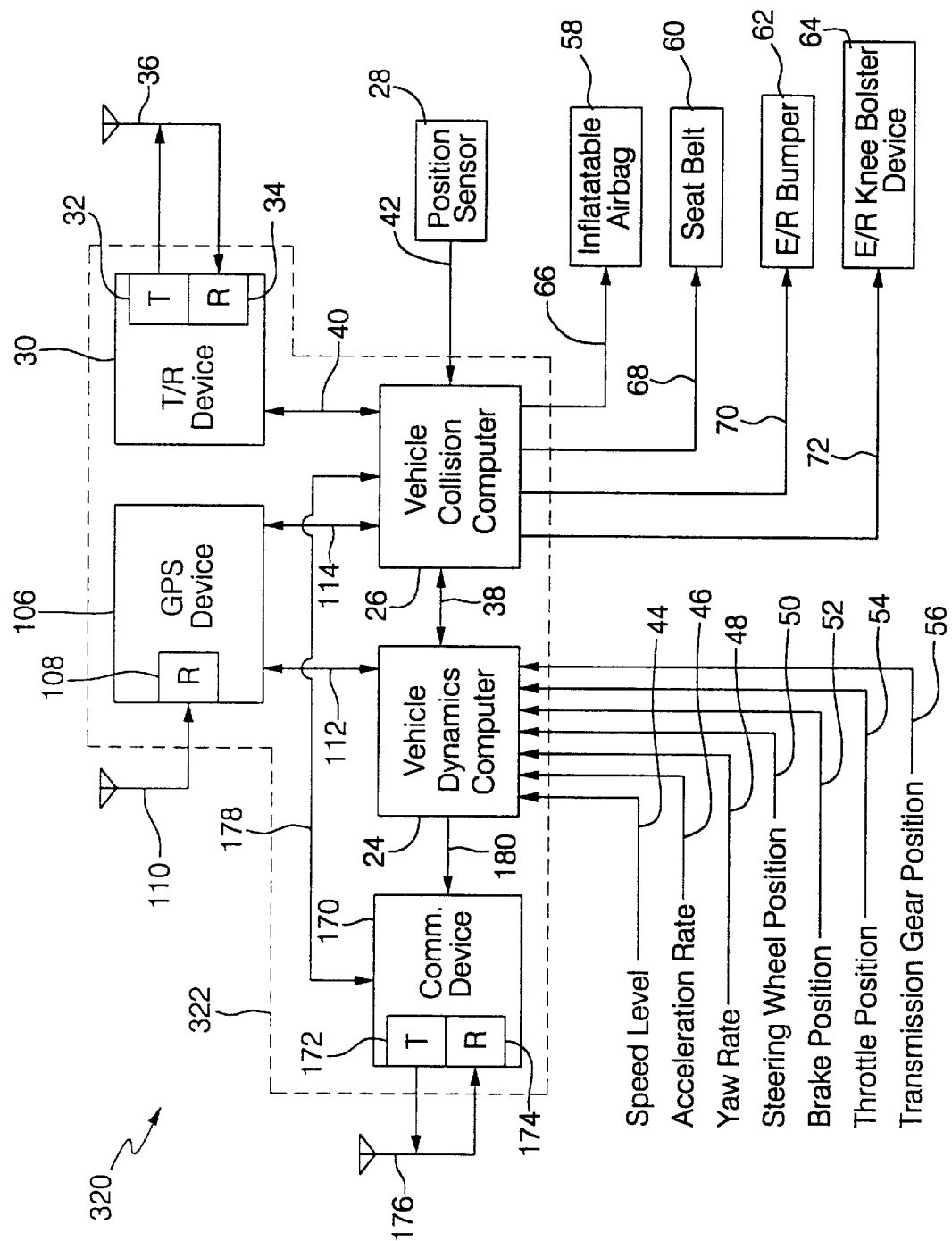
FIG. 13 is a block diagram of a hardware system for deploying responsive devices in a vehicle in anticipation of a collision with an object, wherein the system uniquely includes both a global positioning system device and a vehicle-to-vehicle communications device as compared to the system of FIG. 1.

FIG. 13 is a block diagram of still another alternative hardware system 320 for deploying responsive devices in a vehicle in anticipation of a collision with an object. Similar to the basic hardware system 20 in the first embodiment, the hardware system 320 in the present embodiment includes the position sensor 28 and a computer assembly 322. As compared to the first embodiment, the computer assembly 322 in the present embodiment uniquely includes both the GPS device 106 from the second embodiment and the communications device 170 from the third embodiment in addition to the first computer 24, the transmitter/receiver (T/R) device 30, and the second computer 26. Given such a configuration, the advantages and functional benefits uniquely associated with the particular configurations of the second and third embodiments described earlier hereinabove are hereby successfully combined within a single system, the system 320.

Figure 14:
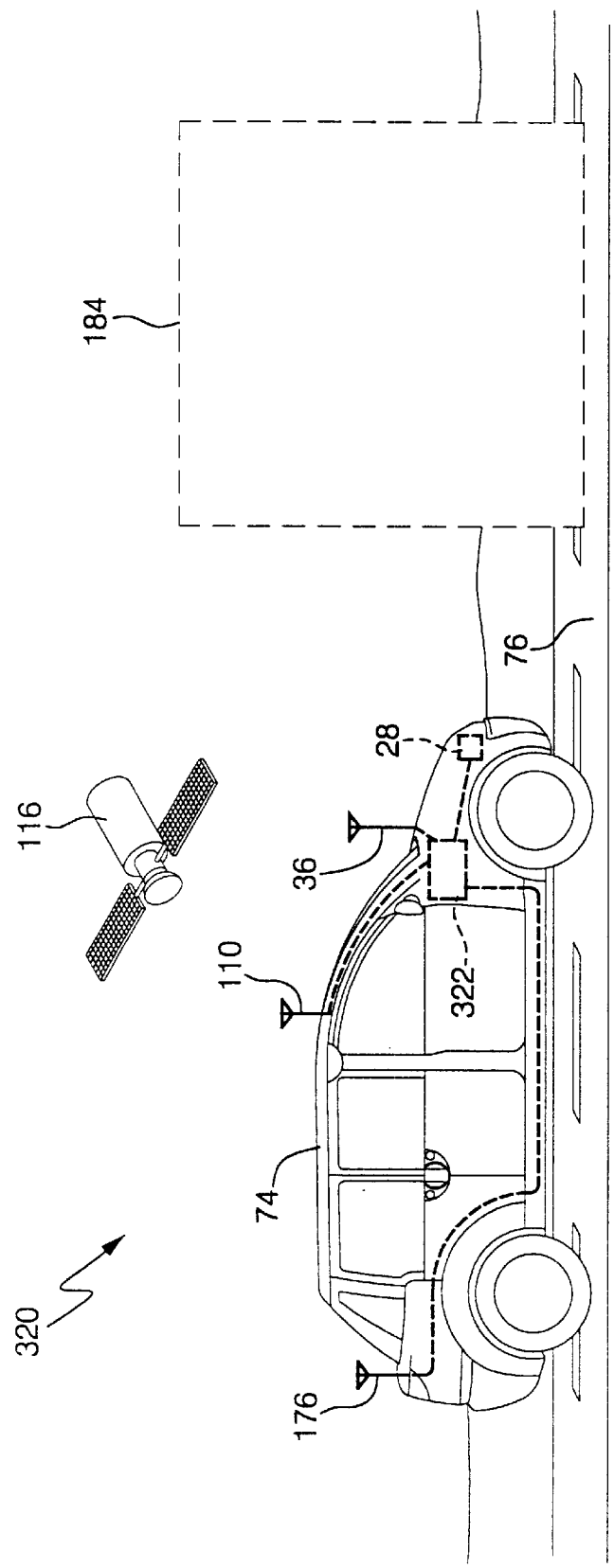
FIG. 14 is an illustration of a subject vehicle having the system of FIG. 13 onboard, wherein the subject vehicle faces a potential collision with an object vehicle having a system like that of the system of FIG. 13 onboard as well.

FIG. 14 is an illustration of the subject vehicle 74 alternatively having the system 320 of FIG. 13 onboard as the subject vehicle 74 travels along the drive path 76. The system 320 is attachable to and/or integrable with the structure of the subject vehicle 74. As illustrated in FIG. 14, the subject vehicle 74 faces a potential collision with an object 184 which is, at least initially, unknown to the system 320 onboard the subject vehicle 74. With the system 320 onboard, the subject vehicle 74 thus has three different means for attempting to positively identify and/or gain information about the object so that collision severity is predicted accurately and vehicle responsive devices are deployed accordingly.

For example, during operation, once an imminent collision is identified by the subject vehicle 74, the subject vehicle 74 may direct and transmit a polling signal to the unknown object 184 via the communications antenna 176 to determine if the object 184 is another vehicle having a reciprocal communications device onboard. If the object 184 is indeed another vehicle having a communications device onboard, then the object vehicle 184 will respond with an affirmative signal. Once the affirmative signal is received by the subject vehicle 74, then both the subject vehicle 74 and the object vehicle 184 can exchange vehicle size data and/or vehicle dynamics data for the purpose of predicting collision severity and deploying vehicle responsive devices accordingly. If, however, the object 184 does not respond with an affirmative signal, the subject vehicle 74 may then alternatively attempt to positively identify the object 184 by seeking to obtain real time subject vehicle position data along with digital map data from the GPS device 106 and thereafter attempting to correlate any of the digital map data obtained from the GPS device 106 with object position data provided by the sensor 28. If attempting to positively identify the object 184 with the aid of the GPS device 106 is successful, then the second computer 26 onboard the subject vehicle 74 can accurately predict collision severity and thereafter deploy responsive devices accordingly. If, however, attempting to positively identify the object 184 with the aid of the GPS device 106 is not successful, the subject vehicle 74 may then direct and transmit an elicitation signal to the object 184 via the antenna 36. If the object 184 returns a response signal, the subject vehicle 74 can then obtain positive identification information from the response signal in the form of a digital code. Once the digital code is obtained, the second computer 26 onboard the subject vehicle 74 can use the digital code to accurately predict the severity of the anticipated imminent collision and deploy vehicle responsive devices accordingly.

While the present invention has been described in what are presently considered to be the most practical and preferred embodiments and/or implementations, it is to be understood that the invention is not to be limited to the disclosed embodiments, but on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A method of deploying responsive devices in a vehicle in anticipation of a collision with an object, said method comprising the steps of:

(a) using a sensor onboard a subject vehicle to identify an imminent collision between said subject vehicle and an object;

(b) directing and transmitting an elicitation signal to said object from said subject vehicle;

(c) receiving onboard said subject vehicle an object-type-specific predefined response signal from a device situated on said object in response to said elicitation signal, said predefined response signal providing information positively identifying the specific type of said object;

(d) using said positive identification information to predict a seventy level of said imminent collision; and (e) selectively deploying at least one responsive device onboard said subject vehicle according to said predicted severity level.

2. The method according to claim 1, wherein said sensor is one of an electromagnetic radar type sensor, a laser radar type sensor, and a pulsed infrared laser type sensor.

3. The method according to claim 1, wherein said subject vehicle is an automobile.

4. The method according to claim 1, wherein the specific type of said object is one of a small diameter tree, a large diameter tree, a mailbox, a sign, a fire hydrant, a post, a concrete filled non-breakaway metal post, a non-breakaway telephone pole, a breakaway light pole, a fence, a guardrail, a building structure, a bridge abutment, and another vehicle.

5. The method according to claim 1, wherein the step (a) includes the steps of:

(a1) obtaining real time subject vehicle dynamics data from a first dedicated computer onboard said subject vehicle;

(a2) using said sensor to obtain real time object position data regarding the real time position of said object with respect to said subject vehicle; and (a3) using said real time subject vehicle dynamics data and said real time object position data to predict a time until collision impact and thereby identify said imminent collision.

6. The method according to claim 5, wherein said real time subject vehicle dynamics data comprises at least one of speed level, acceleration rate, yaw rate, steering wheel position, brake position, throttle position, and transmission gear position of said subject vehicle.

7. The method according to claim 5, wherein the step (a3) is accomplished with a second dedicated computer onboard said subject vehicle.

8. The method according to claim 1, wherein said elicitation signal is an electromagnetic, modulated radio-frequency type signal having a wide frequency bandwidth.

9. The method according to claim 1, wherein the step (b) is accomplished with a transmitter and an antenna situated onboard said subject vehicle.

10. The method according to claim 9, wherein said transmitter is a wideband radio-frequency type transmitter.

11. The method according to claim 1, wherein said predefined response signal is an electromagnetic radio-frequency type signal having at least one narrow frequency bandwidth.

12. The method according to claim 1, wherein said device situated on said object comprises a specially engineered narrow band reflector and step (c) includes the step of:
using said reflector to reflect at least one narrow predetermined frequency band of said elicitation signal as said object-type-specific predefined response signal back toward said subject vehicle.

13. The method according to claim 1, wherein said device situated on said object is a transponder and (c) includes the step of:
using said transponder to receive said elicitation signal and to transmit a predetermined signal as said object-type-specific predefined response signal to said subject vehicle.

14. The method according to claim 1, wherein the step (c) is accomplished with an antenna and a receiver situated onboard said subject vehicle.

15. The method according to claim 14, wherein the step (c) includes the step of:
using at least one filter in said receiver to obtain said information positively identifying the specific type of said object from said predefined response signal in the form of a predetermined digital code.

16. The method according to claim 15, wherein the step (d) includes the steps of:
obtaining real time subject vehicle dynamics data from a first dedicated computer onboard said subject vehicle;
using said sensor to obtain real time object position data regarding the real time position of said object with respect to said subject vehicle;
communicating said real time subject vehicle dynamics data, said real time object position data, and said predetermined digital code to a second dedicated computer onboard said subject vehicle;
using said predetermined digital code to look up and access object-specific object collision impact data pre-stored in a memory associated with said second dedicated computer; and
using said real time subject vehicle dynamics data, subject vehicle collision impact data, said real time object position data, and said object collision impact data to predict said severity level of said imminent collision.

17. The method according to claim 16, wherein said subject vehicle collision impact data comprises at least one of width, height, depth, crush stiffness, and mass of said subject vehicle, and wherein said object collision impact data comprises at least one of width, height, depth, crush stiffness, and mass of said object.

18. The method according to claim 16, wherein:
each said at least one responsive device is resettable or non-resettable; and the step (e) includes the step of:
selectively communicating a deploy signal from said second dedicated computer to said at least one responsive device according to said predicted severity level, wherein said deploy signal serves as an activation signal for any of said at least one responsive device which is resettable, and wherein said deploy signal serves as an enabling signal for any of said at least one responsive device which is non-resettable.

19. The method according to claim 1, wherein:
each said at least one responsive device is resettable or non-resettable; and the step (e) includes the step of:
selectively communicating a deploy signal to said at least one responsive device according to said predicted severity level, wherein said deploy signal serves as an activation signal for any of said at least one responsive device which is resettable, and wherein said deploy signal serves as an enabling signal for any of said at least one responsive device which is non-resettable.

20. The method according to claim 19, wherein at least one said resettable responsive device comprises one of a pre-tensionable seat belt, an extendable/retractable bumper, and an extendable/retractable knee bolster device, and wherein at least one said non-resettable responsive device comprises an inflatable airbag.

21. The method according to claim 1, said method further comprising the steps of:
establishing electromagnetic radio-frequency communication linkage between at least one global positioning system satellite and a global positioning system device having digital map data situated onboard said subject vehicle to obtain real time subject vehicle position data from said satellite for use onboard said subject vehicle;
using said sensor to obtain real time object position data regarding the real time position of said object with respect to said subject vehicle;
using said real time subject vehicle position data and said real time object position data to determine whether said digital map data provides information positively identifying the specific type of said object; and
cross-checking for validation any said information positively identifying the specific type of said object successfully obtained from said digital map data with said information positively identifying the specific type of said object obtained from said device situated on said object.

22. The method according to claim 1, said method further comprising the steps of:
establishing electromagnetic radio-frequency communication linkage between at least one global positioning system satellite and a global positioning system device having digital map data situated onboard said subject vehicle to obtain real time subject vehicle position data from said satellite for use onboard said subject vehicle;
using said sensor to obtain real time object position data regarding the real time position of said object with respect to said subject vehicle;
using said real time subject vehicle position data and said real time object position data to determine whether said digital map data provides information positively identifying the specific type of said object; and performing the method steps (b) and (c) only when said information positively identifying the specific type of said object is unsuccessfully obtained from said digital map data.

23. The method according to claim 1, said method further comprising the steps of:

using onboard said subject vehicle a communications device comprising a transmitter and a receiver to transmit an electromagnetic polling signal to said object when said imminent collision is identified to thereby determine whether said object is another vehicle having another communications device onboard;

performing the method steps (b), (c), and (d) only when said object is other than said another vehicle having another communications device onboard;

receiving onboard said subject vehicle an electromagnetic affirmative signal transmitted from said communications device onboard said object vehicle;

transmitting subject vehicle collision impact data and real time subject vehicle dynamics data from said subject vehicle and receiving said subject vehicle collision impact data and said real time subject vehicle dynamics data onboard said object vehicle;

transmitting object vehicle collision impact data and real time object vehicle dynamics data from said object vehicle and receiving said object vehicle collision impact data and said real time object vehicle dynamics data onboard said subject vehicle;

using said sensor onboard said subject vehicle to obtain real time object vehicle position data regarding the real time position of said object vehicle with respect to said subject vehicle; and using said subject vehicle collision impact data, said real time subject vehicle dynamics data, said real time object vehicle position data, said object vehicle collision impact data, and said real time object vehicle dynamics data to predict said severity level of said imminent collision onboard said subject vehicle.

24. The method according to claim 23, said method further comprising the steps of:

using a sensor onboard said object vehicle to identify said imminent collision between said object vehicle and said subject vehicle;

using said sensor onboard said object vehicle to obtain real time subject vehicle position data regarding the real time position of said subject vehicle with respect to said object vehicle;

using said subject vehicle collision impact data, said real time subject vehicle dynamics data, said real time subject vehicle position data, said object vehicle collision impact data, and said real time object vehicle dynamics data to predict said severity level of said imminent collision; and selectively deploying at least one responsive device onboard said object vehicle according to said predicted severity level.

25. The method of claim 1 wherein said positively identifying the specific type of said object includes using said predefined response signal to look up and access object-specific-type data and object specific collision impact data pre-stored in a memory associated with a second dedicated computer onboard the subject vehicle.

26. The method of claim 25 wherein:

said object-specific-type data is one of a small diameter tree, a large diameter tree, a mailbox, a sign, a fire hydrant, a post, a concrete filled non-breakaway metal post, a non-breakaway telephone pole, a breakaway light pole, a fence, a guardrail, a building structure, a bridge abutment, and another vehicle; and said object specific collision impact data includes at least one of width, height, depth, crush stiffness, and mass of said object.

27. A system for deploying responsive devices in a vehicle in anticipation of a collision with an object, said system comprising:

a sensor, attachable to a subject vehicle, for identifying an imminent collision between said subject vehicle and an object;

a first computer dedicated to processing dynamics data for said subject vehicle;

a second computer, electrically connected to said sensor and said first computer, dedicated to predicting a severity level of said imminent collision;

an antenna attachable to said subject vehicle;

a transmitter, electrically connected between said second computer and said antenna, for transmitting an elicitation signal via said antenna to said object; and a receiver, electrically connected between said antenna and said second computer, for receiving an object-type-specific predefined response signal via said antenna from a device situated on said object in response to said elicitation signal, said predefined response signal positively identifying the specific type of said object;

wherein said second computer is electrically connectable to at least one responsive device onboard said subject vehicle and is capable of using said information positively identifying the specific type of said object to predict said severity level of said imminent collision and to selectively deploy said at least one responsive device according to said predicted severity level.

28. The system according to claim 27, wherein said subject vehicle is an automobile.

29. The system according to claim 27, wherein said sensor is one of an electromagnetic radar type sensor, a laser radar type sensor, and a pulsed infrared laser type sensor.

30. The system according to claim 27, wherein the specific type of said object is one of a small diameter tree, a large diameter tree, a mailbox, a sign, a fire hydrant, a post, a concrete filled non-breakaway metal post, a non-breakaway telephone pole, a breakaway light pole, a fence, a guardrail, a building structure, a bridge abutment, and another vehicle.

31. The system according to claim 27, wherein said dynamics data for said subject vehicle comprises real time dynamics data including at least one of speed level, acceleration rate, yaw rate, steering wheel position, brake position, throttle position, and transmission gear position of said subject vehicle.

32. The system according to claim 27, wherein said elicitation signal is an electromagnetic, modulated radio-frequency type signal having a wide frequency bandwidth.

33. The system according to claim 27, wherein said transmitter is a wideband radio-frequency type transmitter.

34. The system according to claim 27, wherein said predefined response signal is an electromagnetic radio-frequency type signal having at least one narrow frequency bandwidth.

35. The system according to claim 27, wherein said device situated on said object comprises a reflector designed to reflect at least one narrow predetermined frequency band of said elicitation signal as said predefined response signal back toward said subject vehicle, wherein said at least one narrow predetermined frequency band provides said information positively identifying the specific type of said object.

36. The system according to claim 27, wherein said device situated on said object comprises a transponder for receiving said elicitation signal and transmitting a predetermined signal as said predefined response signal to said subject vehicle, wherein said predetermined signal provides said information positively identifying the specific type of said object.

37. The system according to claim 27, wherein said receiver includes at least one filter for obtaining said information positively identifying the specific type of said object from said predefined response signal in the form of a predetermined digital code.

38. The system according to claim 37, wherein said second computer has an associated memory containing pre-stored object-specific object collision impact data which is capable of being looked up and accessed by using said predetermined digital code.

39. The system according to claim 37, wherein:
each said at least one responsive device is resettable or non-resettable; and
said system further comprises at least one responsive device electrically connected to said second computer, wherein said second computer is capable of selectively communicating a deploy signal to said at least one responsive device according to said predicted severity level, said deploy signal thereby serving as an activation signal for any of said at least one responsive device which is resettable, and said deploy signal thereby serving as an enabling signal for any of said at least one responsive device which is non-resettable.

40. The system according to claim 39, wherein at least one said resettable responsive device comprises one of a pretensionable seat belt, an extendable/retractable bumper, and an extendable/retractable knee bolster device, and wherein at least one said non-resettable responsive device comprises an inflatable airbag.

41. The system according to claim 29, said system further comprising a global positioning system device, attachable to said subject vehicle and electrically connected to at least one of said first computer and said second computer, for obtaining real time subject vehicle position data and digital map data for use in providing information positively identifying the specific type of said object.

42. The system according to claim 27, said system further comprising a communications device attachable to said subject vehicle and electrically connected to at least one of said first computer and said second computer, said communications device comprising:
a communications antenna attachable to said subject vehicle;
a transmitter, electrically connected between said communications antenna and at least one of said first computer and said second computer, for transmitting an electromagnetic polling signal via said communications antenna to said object when said imminent collision is identified to thereby determine whether said object is another vehicle having another communications device onboard; and
a receiver, electrically connected between said communications antenna and at least one of said first computer and said second computer, for receiving onboard said subject vehicle an electromagnetic affirmative signal via said communications antenna transmitted from said communications device onboard said object vehicle;
wherein, after receiving said affirmative signal, said communications device is capable of exchanging vehicle collision impact data and real time vehicle dynamics data with said object vehicle, and wherein said vehicle collision impact data and said real time vehicle dynamics data are used to predict said severity level of said imminent collision.

* * * * *

UNITED STATES PATENT AND TRADEMARK OFFICE
CERTIFICATE OF CORRECTION

| | |
|---|---|
| PATENT NO. | : 6,658,336 B2 |
| APPLICATION NO. | : 09/853186 |
| DATED | : December 2, 2003 |
| INVENTOR(S) | : Browne et al. |

Page 1 of 1

It is certified that error appears in the above-identified patent and that said Letters Patent is hereby corrected as shown below:

Column 18, Claim 1, line 43, "seventy level" should read -- severity level --

Signed and Sealed this

Seventeenth Day of July, 2007

JON W. DUDAS
*Director of the United States Patent and Trademark Office*